United States Patent [19]
Nakane et al.

[11] Patent Number: 5,499,863
[45] Date of Patent: Mar. 19, 1996

[54] SEAT BACK FRAME

[75] Inventors: Hideki Nakane; Yasuhiro Nishii; Masami Sugiura, all of Kariya, Japan

[73] Assignee: Toyota Shatai Kabushiki Kaisha, Japan

[21] Appl. No.: 237,584

[22] Filed: May 3, 1994

[30] Foreign Application Priority Data

May 17, 1993 [JP] Japan ................................. 5-139334

[51] Int. Cl.⁶ ........................... A47C 7/40; B60N 2/44
[52] U.S. Cl. ................................ 297/452.2; 297/452.8
[58] Field of Search ........................ 297/452.18, 452.2, 297/216.13, 216.14; 29/91, 91.1

[56] References Cited

U.S. PATENT DOCUMENTS

| | | | |
|---|---|---|---|
| 1,684,062 | 9/1928 | Leach | 297/452.18 |
| 2,371,407 | 10/1941 | Neely. | |
| 2,720,914 | 10/1955 | Doty. | |
| 3,544,164 | 12/1970 | Ohta | 297/452.2 |
| 4,159,847 | 7/1979 | Arai. | |
| 4,290,647 | 9/1981 | Hensel et al.. | |
| 4,364,607 | 12/1982 | Tamburini. | |
| 4,536,030 | 8/1985 | Sakurada et al.. | |
| 4,544,204 | 10/1985 | Schmale | 297/452.18 |
| 4,619,482 | 10/1986 | Itsuki. | |
| 4,695,097 | 9/1987 | Muraishi | 297/452.18 |
| 5,050,932 | 9/1991 | Pipon et al. | 297/452.18 X |
| 5,131,721 | 7/1992 | Okamoto | 297/452.18 |
| 5,328,248 | 7/1994 | Nishiyama | 297/452.18 X |

FOREIGN PATENT DOCUMENTS

| | | | |
|---|---|---|---|
| 233822 | 8/1987 | European Pat. Off. | 297/452.18 |
| 2515946 | 5/1983 | France. | |
| 2525344 | 12/1976 | Germany. | |
| 2632354C3 | 1/1977 | Germany. | |
| 3010662C2 | 9/1981 | Germany. | |
| 3-21638 | 5/1991 | Japan. | |
| 3-50785 | 10/1991 | Japan. | |
| 4348711 | 12/1992 | Japan | 297/452.18 |
| 6-117 | 1/1994 | Japan. | |
| 6-70827 | 3/1994 | Japan. | |
| 2059818 | 4/1981 | United Kingdom. | |
| 2251182 | 7/1992 | United Kingdom. | |
| WO93/16896 | 9/1993 | WIPO. | |

OTHER PUBLICATIONS

German Abstract DE 41 38 647 A1 filed May 27, 1992 without translation.

*Primary Examiner*—Peter R. Brown
*Attorney, Agent, or Firm*—Parkhurst, Wendel & Rossi

[57] ABSTRACT

The upper frame 3 and a pair of the side frames 5 in the frame body 2 are simultaneously formed by bending the first frame plate 20 which is obtained from a raw flat plate by pressing treatment. And the upper frame 3 is formed into a pipe form having a slit 6 with edge portions and the slit 6 is welded at four positions corresponding to the bending portions 3B and the concave portions 9 in the horizontal portion 3C, thereby the slit connecting portions 10 are formed. Accordingly, based on that main members for constructing the seat back frame 1 are formed from the first flat frame plate 20, number of the members for constructing the seat back frame 1 and process number for assembling thereof can be easily reduced. And in case that weight of a driver is locally loaded on the seat back frame 1, the upper frame 3 can resist twisting moment occurring due to weight of the driver based on high rigidity produced from the slit connecting portions 10, therefore it can prevent the seat back frame 1 from being seriously deformed.

13 Claims, 19 Drawing Sheets

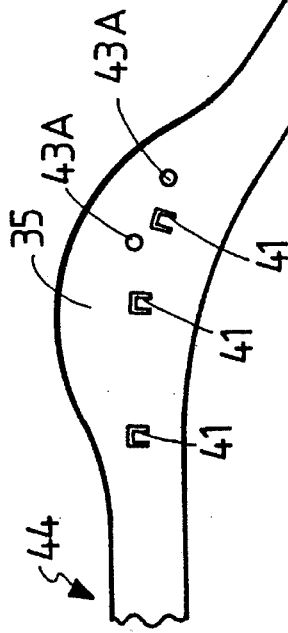
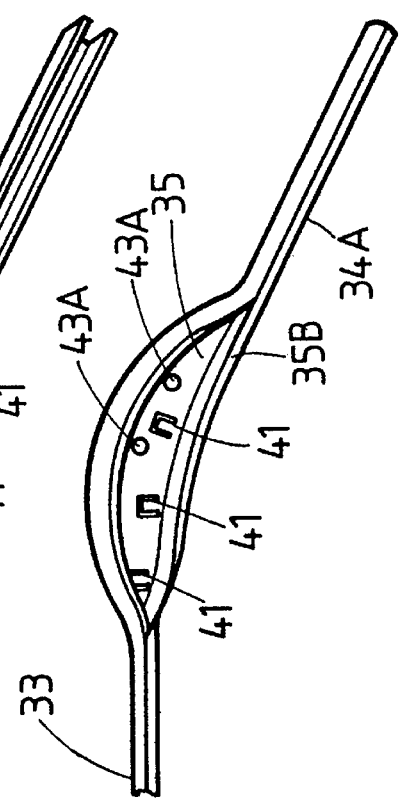
FIG. 14(A) FIG. 14(B) FIG. 14(C)

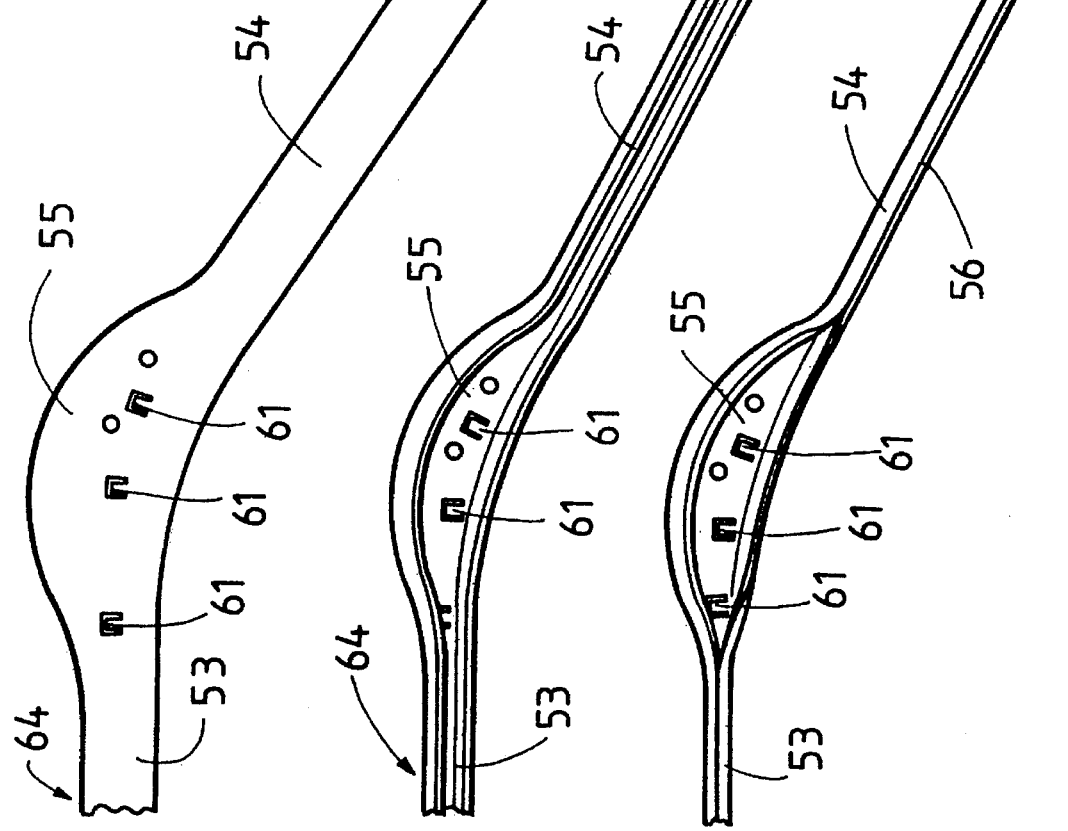
FIG. 17(A)
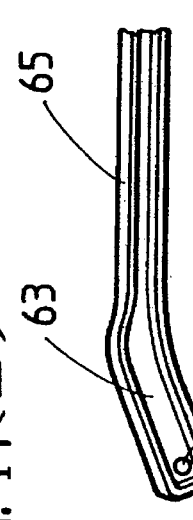
FIG. 17(B)
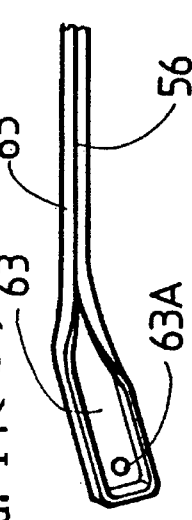
FIG. 17(C)

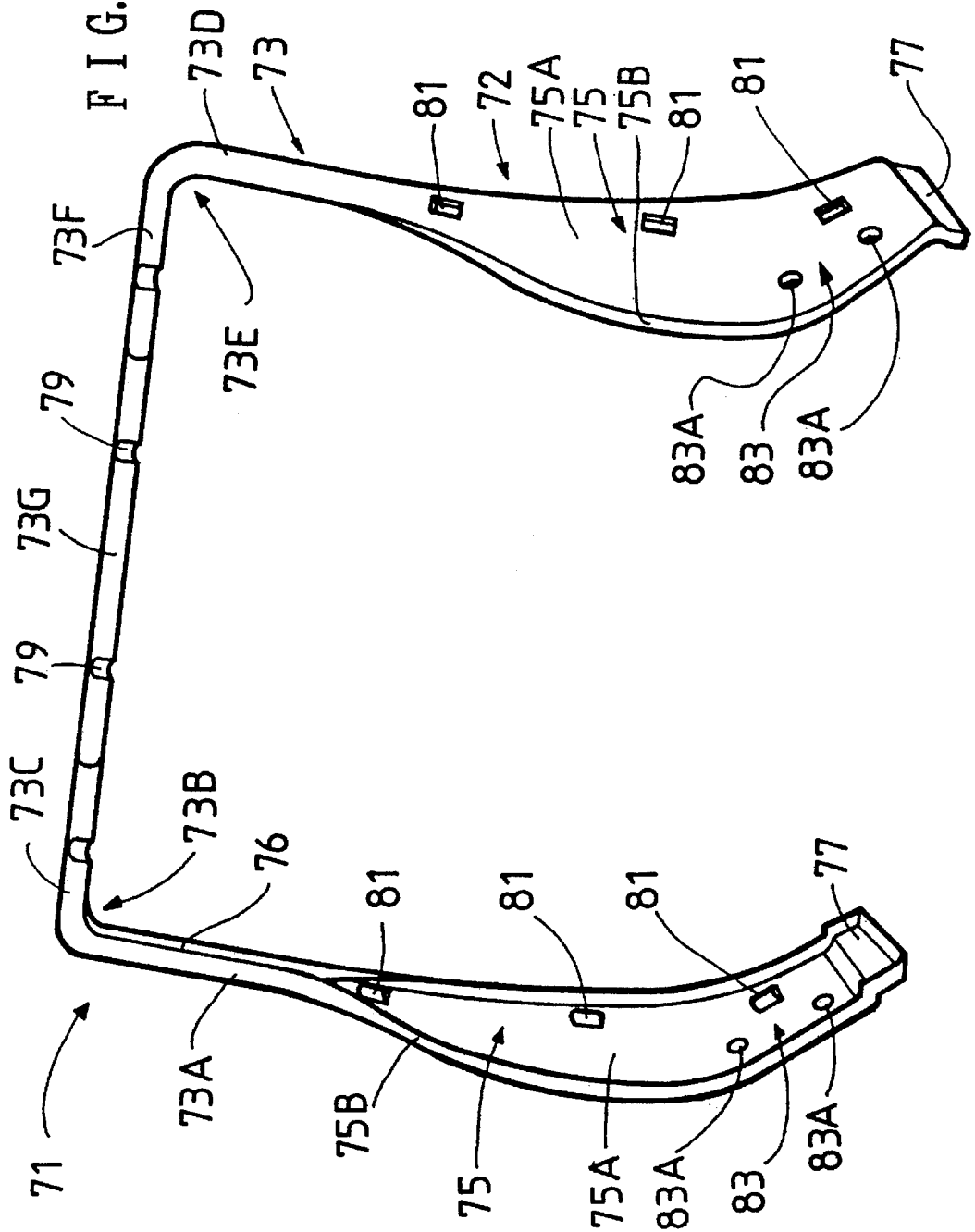

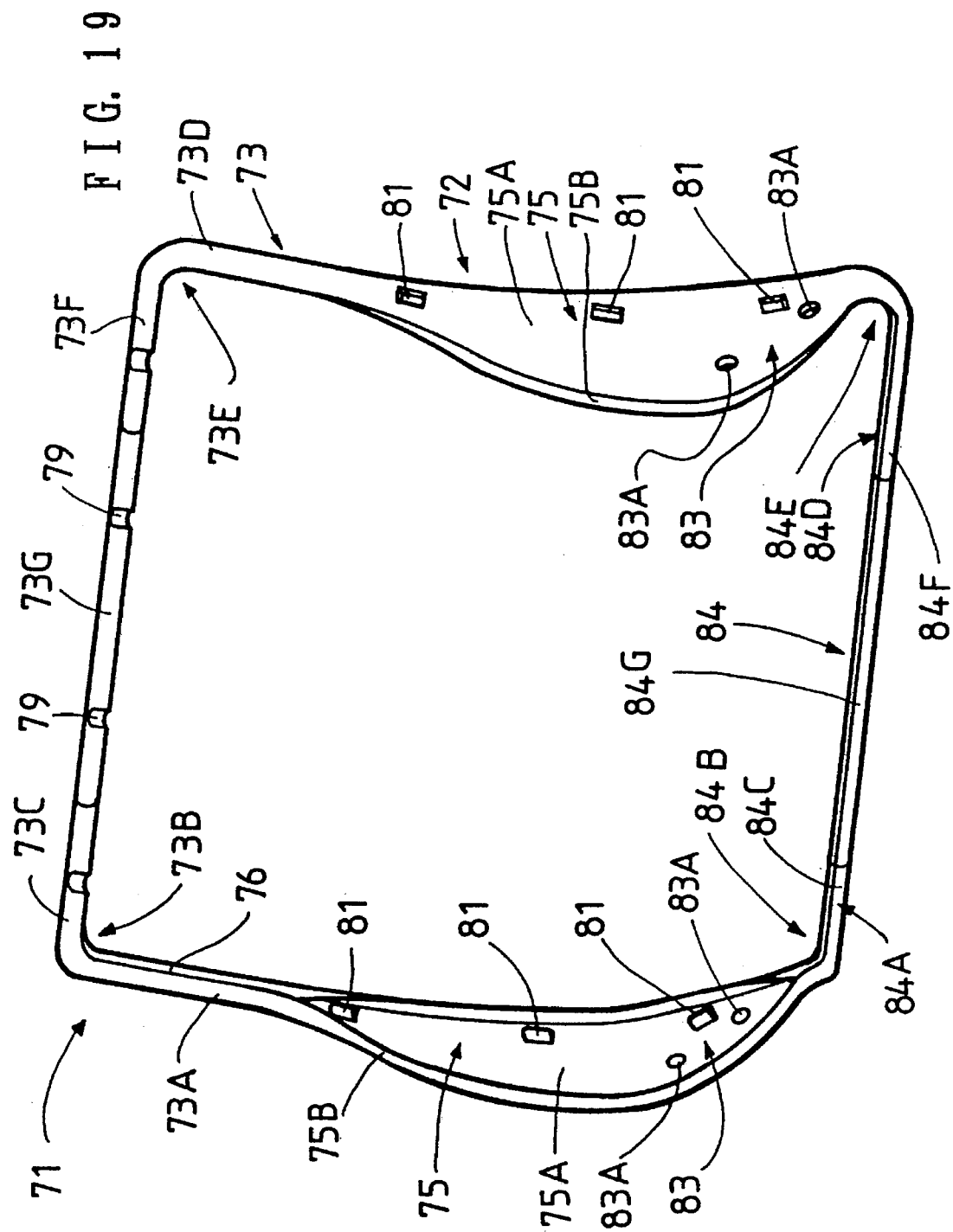

SEAT BACK FRAME

BACKGROUND OF THE INVENTION

1. Field of the Invention

The present invention relates to a seat back frame which constructs a rear backbone of seats installed in a vehicle such as a car, the seat back frame having a frame body in which a pair of side frames to support a driver from both sides thereof are arranged between an upper frame and a lower frame. In particular, the present invention relates to a seat back frame in which at least an upper frame part and a pair of side frames can be formed by pressing treatment and bending treatment of a flat frame plate.

2. Description of Related Art

Conventionally, it is proposed various seat back frames. For instance, a seat back frame in which a pair of side frames are arranged between an upper frame and a lower frame, both being formed in a frame body, is well-known as shown in FIG. 20.

Here, conventional seat back frame will be described referring to FIG. 20. FIG. 20 is a perspective view of a conventional seat back frame. In FIG. 20, a seat back frame 100 is essentially constructed from a frame body 101 in which both an upper frame 102 (the frame positioned at upper side in FIG. 20) and a lower frame 103 (the frame positioned at lower side in FIG. 20) are formed into one body and a pair of side frames 104 each of which is fixed to the left and the right upper frames, respectively.

In the seat back frame 100, the frame body 101 is formed into a predetermined shape, which is substantially square shape and symmetrical at right and left, by bending a hollow pipe at first bending portions 101A, second bending portions 101B and third bending portions 101C. And in the thus formed frame body 101, the upper frame 102 is constructed from an upper part of the frame body 101 than the third bending parts 101C and the lower frame 103 is constructed from a pair of lower pipes 103 A, 103B which are bent toward inner directions at each of the third bending portions 101C. And each end portion of the lower pipes 103A, 103B are mutually faced to and fixed by welding.

And the side frames 104 are formed by fixing both ends of a pair of support wires to the upper frame 102 at positions mutually facing therein through welding. The side frames 104 are formed to support the driver form both sides of the seat back frame 100.

Further, at lower position of the right side frame 104 in FIG. 20 (the right lower position of the upper frame 102), a reclining bracket 105 for connecting a reclining device (not shown) is fixed by welding. And similarly, at the left lower position of the left side frame 104 (the left lower position of the upper frame 102), a hinge plate 106 is fixed by welding, the hinge plate 106 comprising a hinge which is utilized for reclining the seat back frame 100 in cooperation with the reclining device.

On inner sides of the upper frame 102 on which each of the side frames 104 is arranged, two pairs of spring clamps 108 are fixed by welding, the spring clamps 108 being used for installing S-shaped springs 107 which elastically support a cushion pad (not shown). And two S-shaped springs 107 are installed between two pairs of the spring clamps 108. Further, one more S-shaped spring 107 is installed between a pair of spring clamps 109 (only one spring clamp 109 is shown in FIG. 20), each of the spring clamps 109 being formed with the hinge plate 106 and the reclining bracket 105, respectively.

On the upper horizontal part of the upper frame 102 in the frame body 101, a pair of head-rest brackets 110 for installing head-rests (not shown) are fixed by welding.

Next, process for producing the above constructed seat back frame 100 will be given. First, to form the frame body 101, a hollow pipe is bent at the first, the second and the third bending portions 101A, 101B and 101C so that the frame body 101 becomes symmetrical at right and left therein. At this time, the hollow pipe concludes to be bent at six bending portions. And end portions of the lower pipes 103A, 103B which are innerly bent are contacted with each other and thereafter fixed by welding. Thereby, the frame body 101 is formed.

Further, at positions being opposed with each other in the upper frame 102 of the frame body 101, two pairs of spring clamps 108 and a pair of side frames 104 are fixed by spot welding, respectively. And the reclining bracket 105 is fixed by arc welding at the right lower position of the upper frame 102 and the hinge plate 106 is fixed by welding at the left lower position of the upper frame 102. Thereafter, on the upper horizontal part of the upper frame 102 in the frame body 101, a pair of head-rest brackets 110 are fixed by welding.

After the above, two S-shaped springs 107 are installed between the pairs of the spring clamps 108 and one more S-shaped spring 107 is installed between the spring clamps 109 each of which is formed with the hinge plate 106 and the reclining bracket 105, respectively. Thereby, the seat back frame 100 is completed. However, in the conventional seat back frame 100 mentioned above, it is necessary many members, each being formed independently from the frame bode 101, to be fixed to the frame body 101 in order to form the seat back frame 100. For instance, a pair of the side frames 104, the reclining bracket 105, the hinge plate 106 and the spring clamps 108 are necessitated for the seat back frame 100. Therefore, number of the members necessary to construct the seat back frame 100 becomes more and more and thus, total cost of the seat back frame 100 becomes very expensive by summing up costs of the members.

And since each member such as the side frames, etc. is fixed to the frame body 101 by welding, many welding processes are necessary to assemble the seat back frame 100. Thus, assembling cost of the seat back frame 100 becomes very expensive, as a result, there is a problem that cost of the seat back frame 100 is further increased in addition to costs for many members.

Further, in the seat back frame 100, it is necessary to fix each of the members at many positions in the frame body 101 by welding. Thus, since number of welding positions in the frame body 101 is increased it is very difficult to retain precise relations among the members so that each of the members is precisely connected to the frame body 101 with each other. As a result, when the seat back frame 100 is connected to the reclining device there will occur a trouble that rotating operation of the reclining device cannot be smoothly conducted based on connecting error which inevitably occurs among the members.

And in addition to the conventional seat back frame 100 shown in FIG. 20, it is disclosed a seat for vehicle in Japanese Utility Model Application after substantive examination, laid open No. Hei 3-21,638. In the seat for vehicle, a pair of side frame plates are fixed at side positions in a seat back frame and zigzag springs are installed between two pairs of spring clamps each of which is arranged on an inner side of the side frame plate, respectively. Further, on one of the side frame plates, a hinge plate for connecting a reclining device is fixed.

However, in the above seat for vehicle disclosed in Japanese Utility Model Application, the side frame plates, the spring clamps and the hinge plate are independently constructed with each other from the seat back frame. Thus, it is necessary to fix members such as the side frame plates, etc. to the seat back frame by welding, as a result, there still exist problems as same as those described in the above.

Furthermore, it is disclosed another seat back frame in Japanese Utility Model Application after substantive examination, laid open No. Hei 3-50,785. In such seat back frame, a frame backbone of the seat back frame is constructed by connecting a pair of side frames, each of which is formed from a flat plate, through spot welding and S-shaped springs are installed between holes to hook thereof, each hole being opened in the side frame.

However, in the seat back frame disclosed in the above Japanese Utility Model Application, though total number of the members necessary for constructing the seat back frame is reduced, each side frame is independently formed and it is necessary to mutually connect each of the side frames by spot welding. Therefore, it cannot be totally obtained enough strength by the above seat back frame and cost thereof cannot be reduced since the side frames have to be connected by spot welding and thus producing cost is increased. Further, an upper frame part of the seat back frame which is constructed by connecting each of the side frames is formed in a state of flat plate. Based on this construction, the upper frame part cannot retain enough strength against twisting moment loaded on the seat back frame. As a result, there is a problem that the seat back frame is easily twisted when driver's weight is loaded on the upper right portion or the upper left portion of the seat back frame through his hand(s).

SUMMARY OF THE INVENTION

Accordingly, it is an object of the present invention to overcome the above mentioned problems and to provide a seat back frame through which not only number of members for constructing the seat back frame and process number for assembling thereof can be effectively reduced, thereby cost of the seat back frame can be totally reduced, but also enough strength against twisting moment can be obtained while retaining precise positional relations among the members.

In order to accomplish the above object, the first invention provides a seat back frame including; a frame body with an upper frame and a lower frame; a pair of side frames each of which is formed between the upper frame and the lower frame, the side frames supporting a driver from both sides of the seat back frame;

wherein at least the upper frame and the side frames are formed by bending a frame plate which is obtained from a raw flat plate through pressing treatment; and wherein the upper frame is formed into a pipe form having a slit with edge portions and the slit is welded at several positions of the edge portions.

And the second invention provides a seat back frame including; an upper frame; a lower frame; a connecting frame continuously formed from one end of the upper frame; an installing portion for installing a reclining device; a side frame which is formed between the other end of the upper frame and one end of the lower frame, the side frame supporting a driver from one side of the seat back frame;

wherein the installing portion, the upper frame, the side frame and the lower frame are formed by bending a frame plate which is obtained from a raw flat plate through pressing treatment; and wherein the other end of the lower frame is welded to the installing portion.

Further, the third invention provides a seat back frame including; a frame body with an upper frame and a lower frame; a pair of side frames each of which is formed between the upper frame and the lower frame, the side frames supporting a driver from both sides of the seat back frame;

wherein the upper frame is constructed from a first upper member continuously extended from an upper end of one side frame; a second upper member continuously extended from an upper end of the other side frame; and a third upper member connecting both the first upper member and the second upper member;

wherein both the one side frame and the first upper member and both the other side frame and the second upper member are respectively formed by bending a frame plate which is obtained from a raw flat plate through pressing treatment; and wherein the third upper member is welded to both the first upper member and the second upper member.

In each of the seat back frames according to the first, the second and the third inventions, the seat back frame is combined with a cushion pad and a seat cover covering the cushion pad, thereby a seat back is formed. And a driver who sits on the seat back is supported through the side frame(s) formed in the frame body between the upper frame and the lower frame from both sides (one side) of the seat back.

Here, in the first invention, both the upper frame and the side frames in the frame body of the seat back frame are formed by bending a frame plate which is obtained from a raw flat plate through pressing treatment and the upper frame is formed into a pipe form having a slit with edge portions and further, the slit is welded at several positions of the edge portions. According to the construction of the first invention, it is not necessary that the upper frame and the side frames are independently formed and welded with each other, therefore the upper frame and the side frames can be simultaneously formed into one body from one frame plate. Further, based on that the slit of the upper frame is welded at several positions of the edge portions, it can prevent the seat back frame from being seriously deformed since the upper frame can resist against twisting moment occurring due to weight of the driver based on high rigidity thereof, in case that weight is locally loaded on the seat back frame by the driver. And total cost of the seat back frame can be reduced because number of members constructing the seat back frame and number of processes for assembling thereof are decreased.

And in the second invention, the installing portion for installing a reclining device, the upper frame, the side frame and the lower frame are formed by bending a frame plate which is obtained from a raw flat plate through pressing treatment and the seat back frame is constructed by welding the lower frame to the installing portion. According to the construction of the second invention, the main members constructing the seat back frame can be simultaneously formed into one body, thus number of the members can be reduced.

Further, in the third invention, the upper frame of the frame body is constructed from the first upper member, the second upper member and the third upper member. And both one side frame and the first upper member and both the other side frame and the second upper member are respectively formed by bending a frame plate which is obtained from a raw flat plate through pressing treatment. Thereafter, the seat back frame is constructed by welding the third upper member to both the first and the second upper members. Therefore, according to the construction of the third invention, it can correspond to the seat back frame of a seat back having various widths by dividing the upper frame into three pieces.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the following drawings, wherein:

FIG. 18 is a perspective view of a seat back frame except for a lower frame according to the fourth embodiment, FIG. 19 is a perspective view of a seat back frame corresponding to the other modification of the fourth embodiment and FIG. 20 is a perspective view of a conventional seat back frame.

DETAILED DESCRIPTION OF THE PREFERRED EMBODIMENTS

Figure 1:
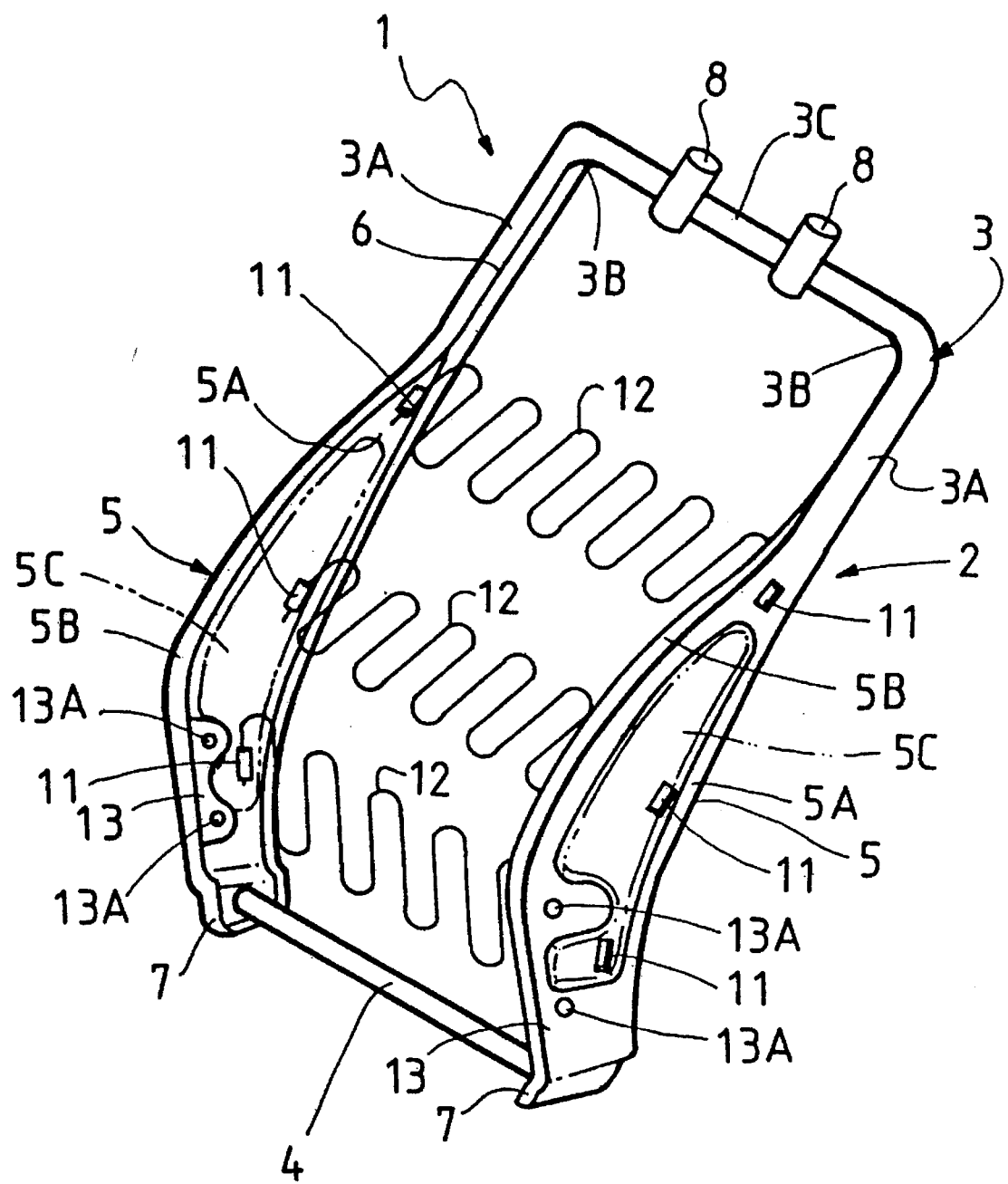
FIG. 1 is a perspective view of a seat back frame according to the first embodiment.
Figure 2:
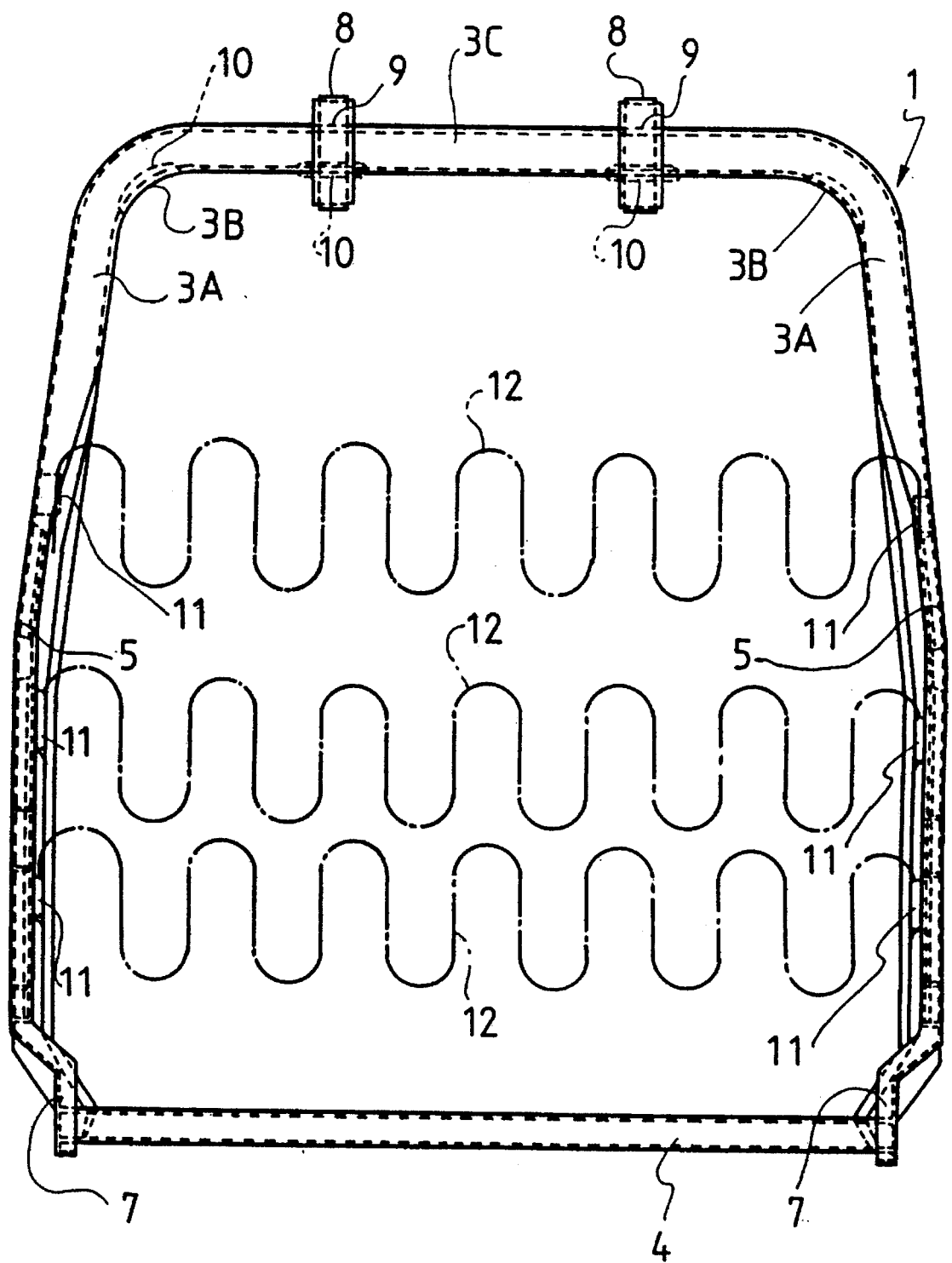
FIG. 2 is a front view of the seat back frame.
Figure 3:
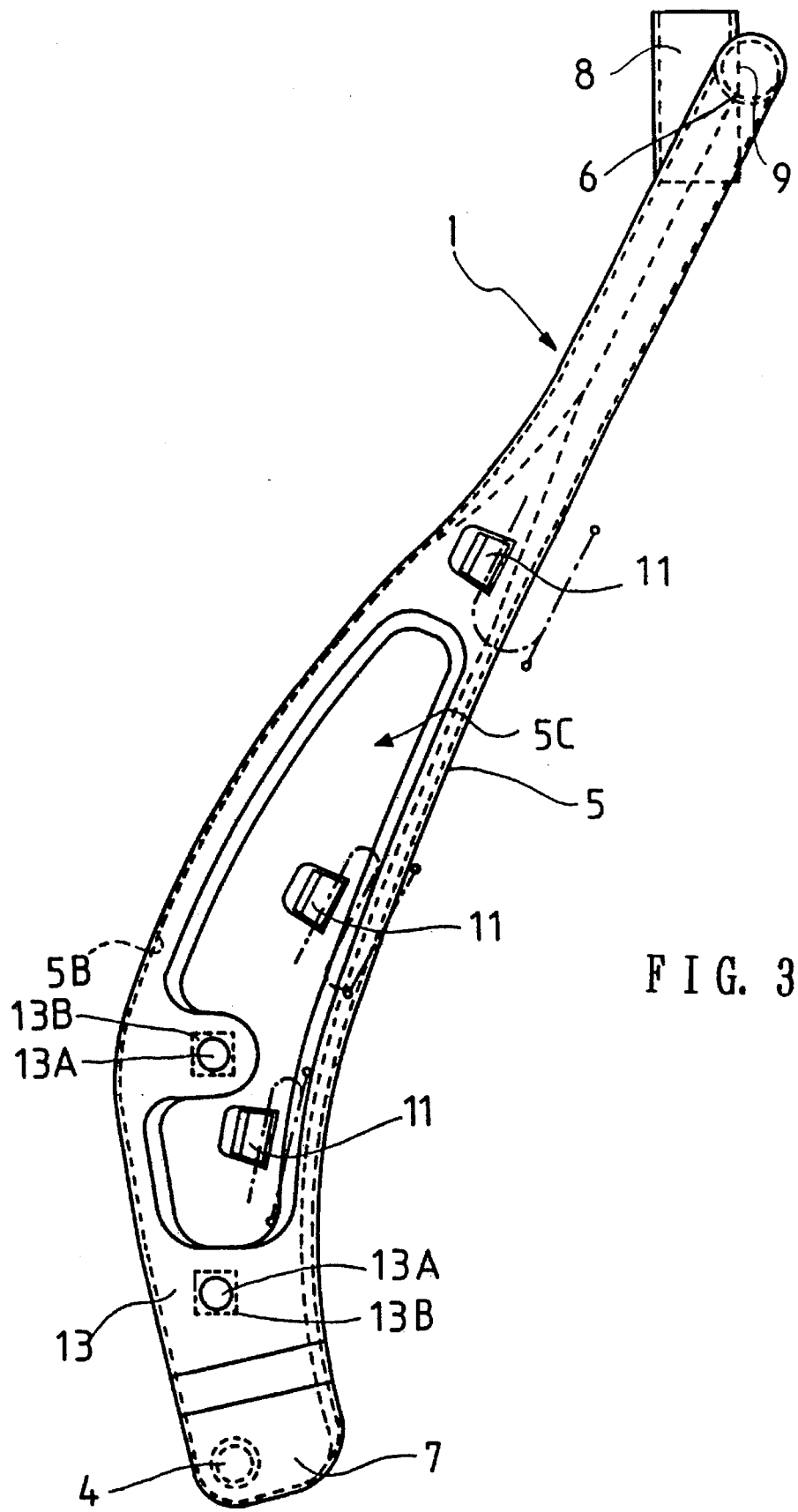
FIG. 3 is a side view of the seat back frame.

A detailed description of the preferred embodiments according to the present invention will now be given referring to the accompanying drawings. First, s seat back frame of the first embodiment will be described with reference to FIGS. 1–7, hereinafter. In FIGS. 1–3, a seat back frame 1 is basically constructed from a frame body 2 which is shaped in rectangle. And the frame body 2 has an upper frame 3 constructing an upper part of the seat back frame 1, a lower frame 4 constructing a lower part thereof and a pair of side frames 5 each of which is formed between the upper frame 3 and the lower frame 4.

Here, the upper frame 3 and the side frames 5 are, as mentioned hereinafter, simultaneously formed into one body by bending a first frame plate 20 which is obtained through punching a thin raw metallic plate such as an iron plate into a predetermined shape by pressing treatment. The upper frame 3 is formed into a pipe construction having a closed section with a slit 6 and each of the side frames 5 is formed into a flat shape.

The slit 6 is continuously formed, as shown in FIGS. 1, 3, on central position of an inner side surface in the upper frame 3. Based on this construction, the upper frame 3 can be easily bent through a few bending processes by bending the upper frame 3 according to a predetermined direction. And while bending of the upper frame 3, the upper frame 3 can be precisely bent without twisting thereof.

And the side frames 5 support a driver sitting a seat back from both sides of the seat back frame 1. And the lower frame 4 is, as mentioned hereinafter, formed into a pipe construction through bending treatment of a second frame plate 21 which is obtained from the raw plate when the first frame plate 20 is taken and further both ends of the lower frame 4 are fixed by welding to installing portions 7 formed at lower ends of the side frames 5 by slightly bending thereof.

The upper frame 3 has a pair of standing portions 3A each of which is upward extended from each of the side frames 5 as shown in FIG. 1 and a horizontal portion 3C horizontally connecting between both the standing portions 3A through a pair of bending portions 3B. And in the horizontal portion 3A, a pair of concave portions 9 (shown in FIGS. 2, 3) for fixing a pair of head-rest brackets 8 are formed. On the concave portions 9, the head-rests 8 are fixed by welding. The head-rest brackets 8 are utilized for supporting head-rests (not shown). Here, each of the head-rest brackets 8 is, as shown in FIG. 7, is welded at four points on each of the concave portions 9.

Further, corresponding to each of the bending portions 3B and each of the concave portions 9, edge portions of the slit 6 in the upper frame 3 are, as shown in FIG. 2, mutually welded and thereby slit connecting portions 10 are formed. Each of these slit connecting portions 10 is to give high twisting rigidity to the upper frame 3. Based on the slit connecting portions 10, it can certainly prevent the seat back from being deformed in case that weight of the driver is locally loaded to upper part of the seat back.

Each of the side frames 5 is continuously formed from each lower end of the standing portions 3A in the upper frame 3 and the side frame 5 is constructed from a flat plate 5A and a wall 5B surrounding the flat plate 5A. The wall 5B is formed by gradually opening the slit 6 and surrounding the flat plate 5A. And in the flat plate 5A, a bead 5C for reinforcing the flat plate 5A is formed. Here, the wall 5B and the bead 5C formed in the flat plate 5A of the side frame 5 act to give high rigidity to the flat plate 5A.

And in each of the flat plates 5A of the side frames 5, three spring clamps 11 are formed by innerly raising the flat plate 5A at three positions. Three pairs of S-shaped springs 12 are installed between three pairs of the spring clamps 11.

At each lower part of the side frames 5, a reclining installing portion 13 for installing a reclining device (not shown) is formed into one body with the side frame 5 and a nut 13B is fixed to a installing hole 13A opened in the reclining installing portion 13. And the reclining device is installed to the installing portion 13 through the installing hole 13A and the nut 13B.

Figure 4:
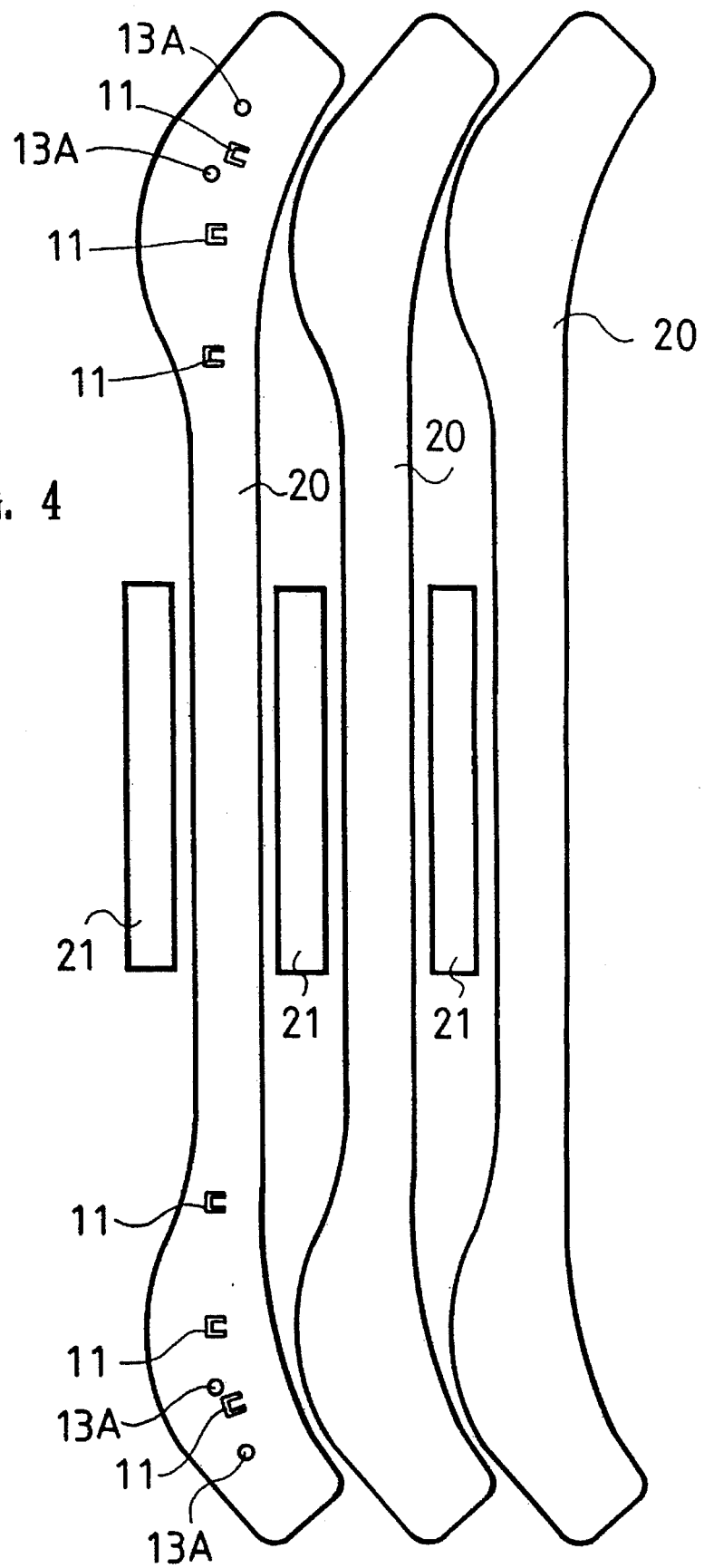
FIG. 4 is a plan view showing a state where first frame plates each for forming an upper frame and a pair of side frames and second frame plates each for forming a lower frame are taken from an original raw plate, FIGS. 5(A–C) are views for explaining a state where the upper frame and the side frames are formed from the first frame plate by bending thereof.

Next, process for producing the above constructed seat back frame 1 will be described with reference to FIGS. 4–7. At first, as shown in FIG. 4, both the first frame plate 20 which is utilized for forming the upper frame 3 and the side frames 5 and the second frame plate 21 which is utilized for forming the lower frame 4 are simultaneously punched and obtained from the raw flat metallic plate by pressing treatment.

At that time, the second frame plate 21 is obtained from the portion of the raw metallic plate existing between both the first frame plates 20 by effectively using the shape of the first frame plate 20, thereby the raw plate can be efficiently used without wasting thereof. And when the frame plates 20, 21 are taken, portion for forming the side frame 5 in the first frame plate 20 is punched with a size in which bending area for forming the wall 5B in a subsequent process is added. And three holes shaped like as "⊐" are formed in each of the side frame 5 at three positions where the spring clamps 11 are raised and further the installing holes 13A of the reclining installing portions 13 are opened.

Figure 5A:
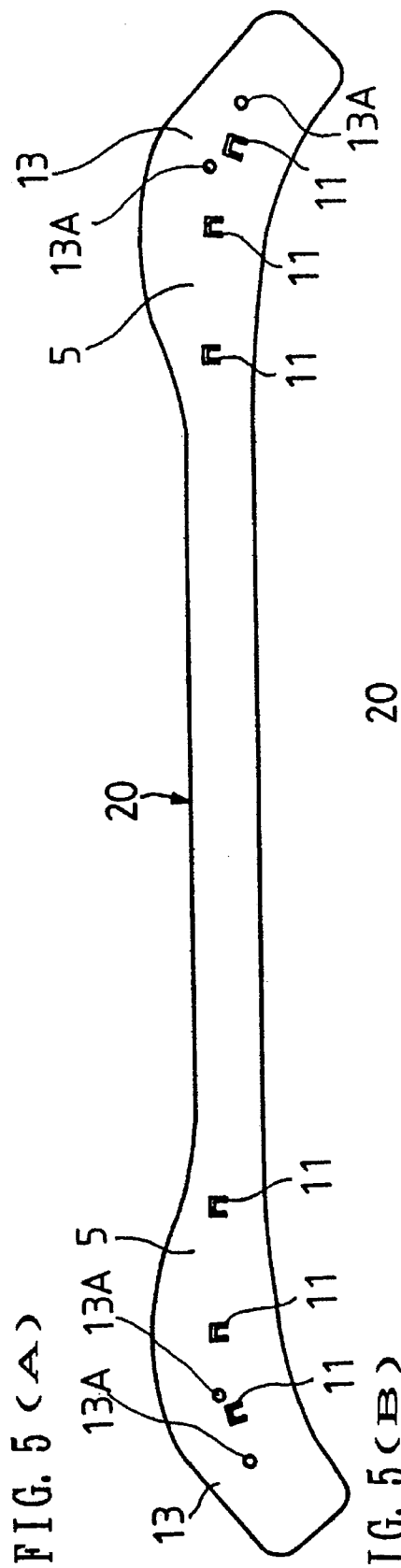
Figure 5B:
Figure 5C:
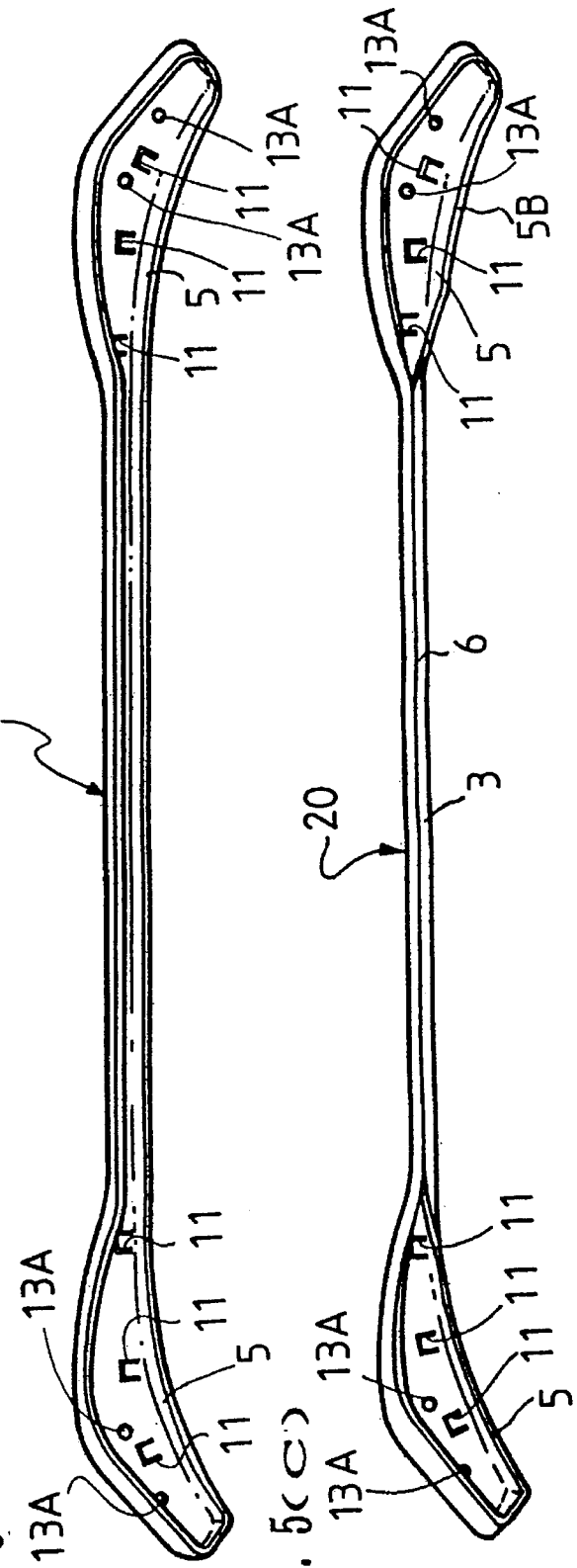

Following to the above, periphery of each side frame 5 is reduced by reduction process and thereby, as shown in FIG. 5 (B), the wall 5B is formed around each of the side frame 5. Similarly to the side frames 5, walls are formed at side edges of portion which becomes the upper frame 3. Further, at the same time when the above reduction process is conducted, the installing portion 7 is formed at each end of the side frames 5 by bending both ends (lower ends) of the side frames 5. And the spring clamps 11 are formed by raising process thereof. Next, as shown in FIG. 5(C), the walls formed at side edges of the upper frame 3 are round bent into pipe form, thereby the upper frame 3 is formed into the shape with closed section having the slit 6.

Figure 6:
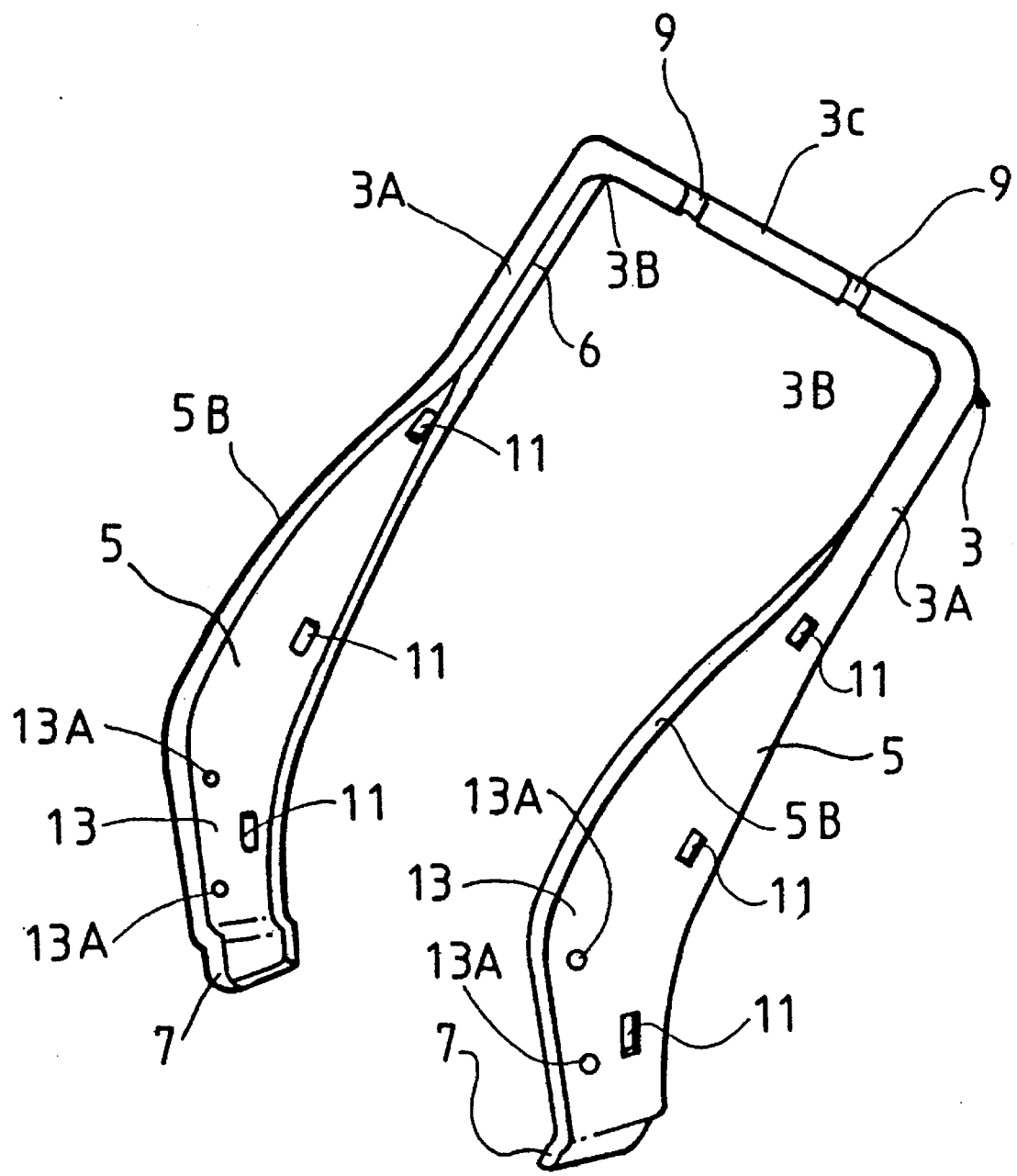
FIG. 6 is a perspective view of the seat back frame before the lower frame is fixed, FIG. 7(A–C) are views showing a fixation part formed in the upper frame on which a head-rest bracket is fixed by welding.

Thereafter, the standing portions 3A and the horizontal portion 3C are formed by bending the upper frame S at two bending portions 3B through bending machine and further two concave portions 9, which are utilized for fixing the head-rest brackets 8, are formed at two positions in the horizontal portion SC. The thus constructed state is shown in FIG. 6. And at each of the installing portions 7 formed at each of the lower ends of the side frames 5, both ends of the lower frame 4, which is obtained from the second frame plate 21 by rounding thereof into pipe form, are fixed by welding.

Further, a pair of the head-rest brackets 8 are set to the concave portions 9 in the horizontal portion SC, as shown in FIG. 3, thereafter each of the brackets 8 is fixed by welding at four positions in each of the concave portions 9.

Figure 7A:
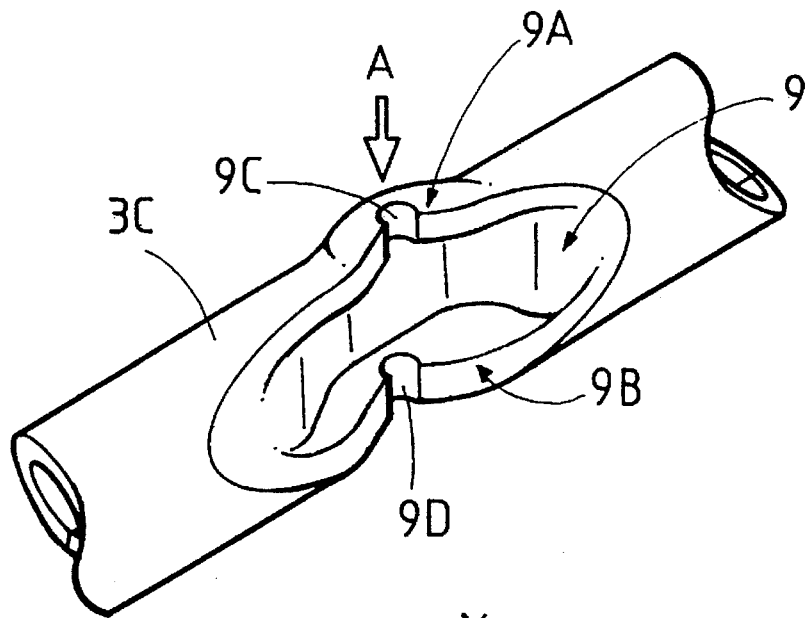

Here, method for welding the head-rest bracket 8 and the concave portion 9 will be described referring to FIG. 7. FIG. 7(A) is a perspective view of the horizontal portion SC in which the concave portion 9 is enlarged, FIG. 7(B) is a plan view of the horizontal portion 3C in case of seeing according to a direction shown by an arrow A in FIG. 7(A) and FIG. 7(C) is a X–X' sectional view of the horizontal portion 3C in case of seeing from X–X' section in FIG. 7(A).

Figure 7B:
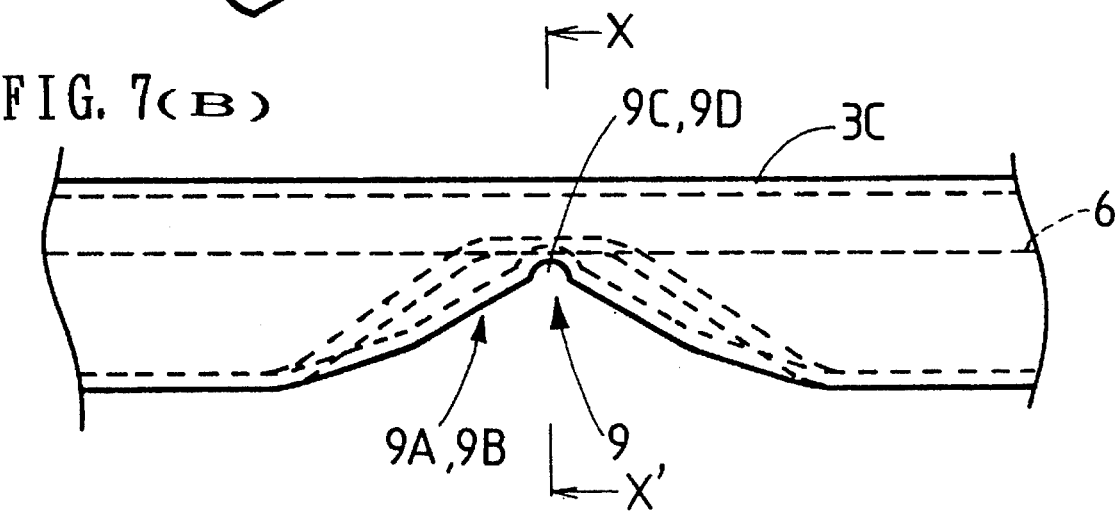
Figure 7C:
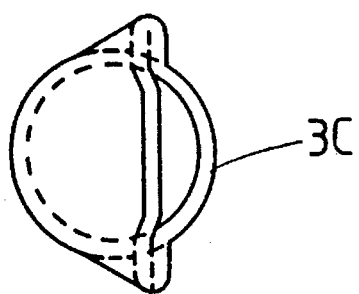

In FIGS. 7(A), 7(B), 7(C), the concave portion 9 is formed by pressing the horizontal portion 3C from the side direction thereof and two welding portions 9A and 9B are formed at both the upper side and the lower side of the concave portion 9, respectively. And in the welding portions 9A, 9B, a splitting grooves 9C, 9D are formed, respectively and portion existing between the welding portion 9A and 9B is innerly concaved within the horizontal portion 3C. Thus, if the head-rest bracket 8 having a round pipe shape is set to the concave portion 9, the head-rest bracket 8 is contacts with each of the welding portions 9A, 9B at two positions on both sides of each splitting groove 9C, 9D. Therefore, in case that the head-rest bracket 8 is fixed by spot welding onto the concave portion 9 while setting the bracket 8 to the concave portion 9, the head-rest bracket 8 is fixed onto the concave portion 9 at four positions. As mentioned above, if the head-rest bracket 8 is fixed by spot welding onto the concave portion 9, fixation of both the bracket 8 and the concave portion 9 can be welded for very short time and it can prevent the head-rest bracket 8 from being easily removed since the bracket 8 is welded onto the concave portion 9 at four positions.

After a pair of the head-rest brackets 8 are fixed by spot welding onto the concave portions 9, corresponding to each of the bending portions 3B and each of the concave portions 9, edge portions of the slit 6 in the upper frame 3 are mutually welded and thereby the slit connecting portions 10 are formed. Based on each of these slit connecting portions 10, the upper frame 3 concludes to have high twisting rigidity. Therefore, it can certainly prevent the seat back from being deformed in case that weight of the driver is locally loaded to upper part of the seat back. Further, each of three S-shaped springs 12 is installed between each pair of the spring clamps 11, thereby the seat back frame 1 is completed.

Next, operation of the seat back frame 1 will be described. The seat back frame 1 is combined with a cushion pad and a seat cover covering the cushion pad, as a result, a seat back is formed. And when the driver sits on the seat back, the driver is supported from both sides of the seat back frame 1 through a pair of the side frames 5 each of which is formed between the upper frame 3 and the lower frame 4.

As detailedly mentioned above, according to the seat back frame 1 of the first embodiment, both the upper frame 3 and the side frames 5 in the frame body 2 of the seat back frame 1 are simultaneously formed from the first frame plate 20 obtained from the raw flat metallic plate by bending treatment through bending machine. Therefore, main members to form the seat back frame 1 such as the upper frame 3, the side frames 5, the spring clamps 11 and the reclining installing portions 13 can be simultaneously obtained from one flat first frame plate 20. Thereby, the number of the members and the assembling processes can be reduced, as a result, total cost of the seat back frame 1 can be easily reduced.

And the upper frame 3 is formed into pipe shape with the closed section having the slit 8 and further corresponding to each of the bending portions 3B and each of the concave portions 9, the slit connecting portions 10 are formed by mutually welding the edge portions of the slit 8 in the upper frame 3. Therefore, the upper frame 3 can prevent the seat back from being deformed based on high twisting rigidity given to the upper frame 3 through the slit connecting portions 10, in case that weight of the driver is locally loaded to upper part of the seat back.

The slit 6 is continuously formed, as shown in FIGS. 1, 3, on central position of an inner side surface in the upper frame 3. Based on this construction, the upper frame 3 can be easily bent through a few bending processes by bending the upper frame 3 according to a predetermined direction. And while bending of the upper frame 3, the upper frame 3 can be precisely bent without twisting thereof.

Further, since each of the head-rest brackets 8 is fixed by spot welding onto the welding portions 9A, 9B in each of the concave portions 9 at four positions, the head-rest brackets 8 can be firmly fixed to the upper frame 3.

And since the reclining installing portions 13 connected to the reclining deice are formed into one body with the side frames 5, it is not necessary to weld reclining installing members, which are independently formed and utilized for installing the reclining device, to the seat back frame 1. Therefore, at this point, number of the members and total cost of the seat back frame 1 can be reduced. Further, since the reclining installing portions 13 are obtained by conducting pressing treatment to the first frame plate 20, the portions 13 can be formed with high positional precision, as a result, reclining operation can be smoothly done when the seat back frame 1 is reclined through the reclining device connected to the reclining installing portions 13.

Further, in the side frame 5, the wall 5B is formed around the flat plate 5A and the bead 5C is formed on the flat plate 5A. Therefore, it can certainly prevent the flat plate 5A from being transformed when outer force is added to the side frame 5. And rigidity of the flat side frame 5 can be reinforced based on that the reclining device is connected to the reclining installing portions 13 each of which is formed in each of the side frames 5 of the seat back frame 1.

While the invention has been particularly shown and described with reference to preferred embodiments thereof, it will be understood by those skilled in the art that the foregoing and other changes in form and details can be made therein without departing from the spirit and scope of the invention.

For instance, in the above seat back frame 1 according to the first embodiment, though high twisting rigidity is given to the upper frame 3 by forming the slit connecting portions 10 corresponding to each of the bending portions 3B and each of the concave portions 9 through welding the edge portions of the slit 6 in the upper frame 3, the other method for giving high twisting rigidity to the upper frame 3 is utilizable as follows.

Figure 8:
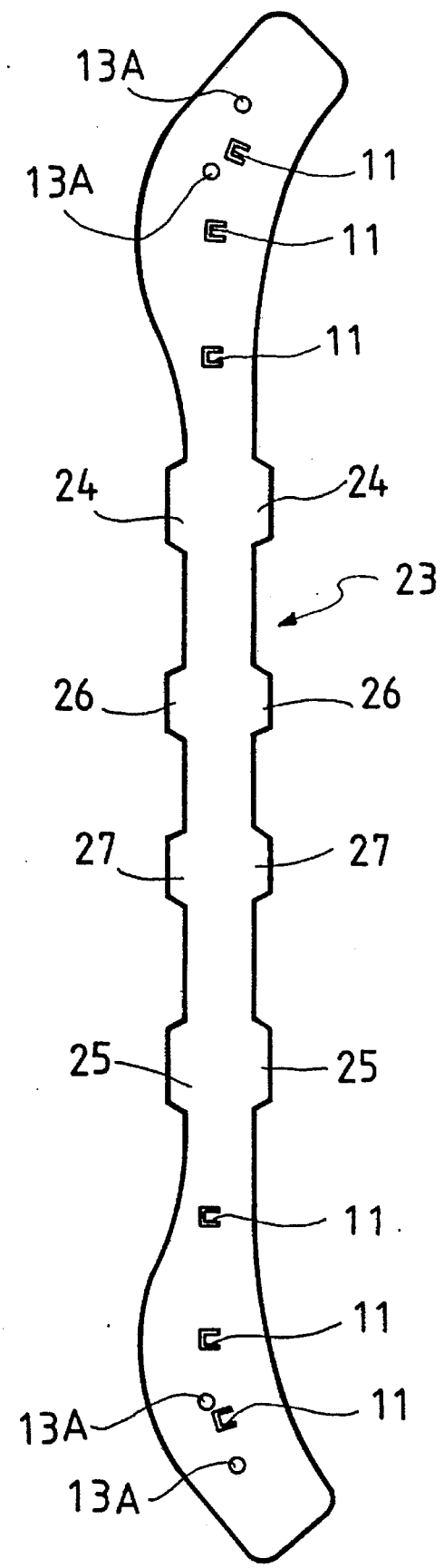
FIG. 8 is a plan view showing a third frame plate for forming the upper frame and the side frames.

The other method will be described hereinafter with reference to FIGS. 8–11. Here, in the following, different point from the above first embodiment will be mainly described and the same members disclosed in the first embodiment are numbered as the same reference number as in the first embodiment At first, as shown in FIG. 8, a third frame plate 23 from which both the upper frame 3 and the side frames 5 are formed is taken from the raw flat metallic plate. In part of the third frame plate 23 to form the upper frame 3, pairs of junction plates 24, 25 are respectively formed on both sides corresponding to positions where the bending portions 3B are formed. And pairs of junction plates 26, 27 are respectively formed on both sides corresponding to positions where the concave portions 9 are formed.

Figure 10:
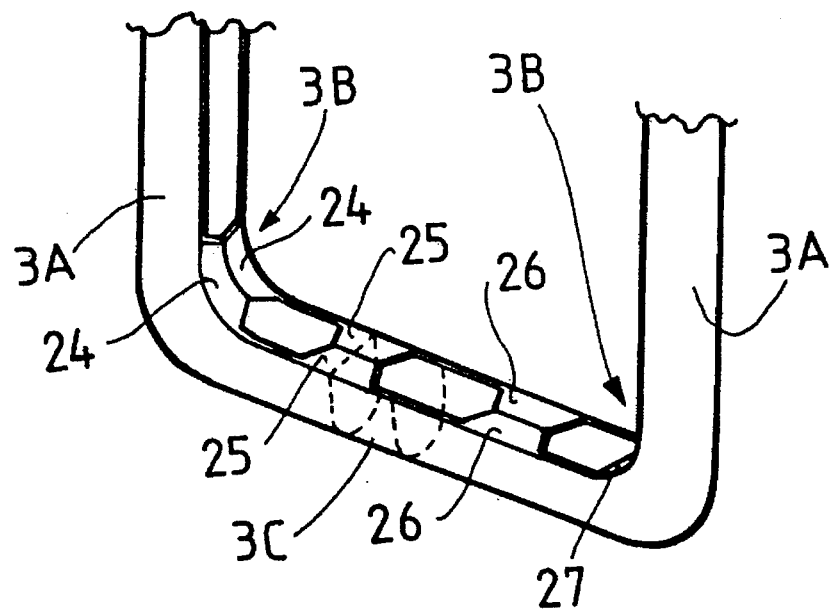
FIG. 10 is a view for explaining a state where the upper frame of the seat back frame shown in FIG. 9 is bent.

Here, the junction plates 24, 25, 26, 27 are mutually fixed by welding when the upper frame 3 is bent. And portion of the upper frame 3 where the junction plates 24, 25, 26, 27 do not exist is bent into a shape with a section having substantially "U" shape by opening lower side thereof, as shown in FIG. 10. The other construction is as same as in the first embodiment.

Figure 9:
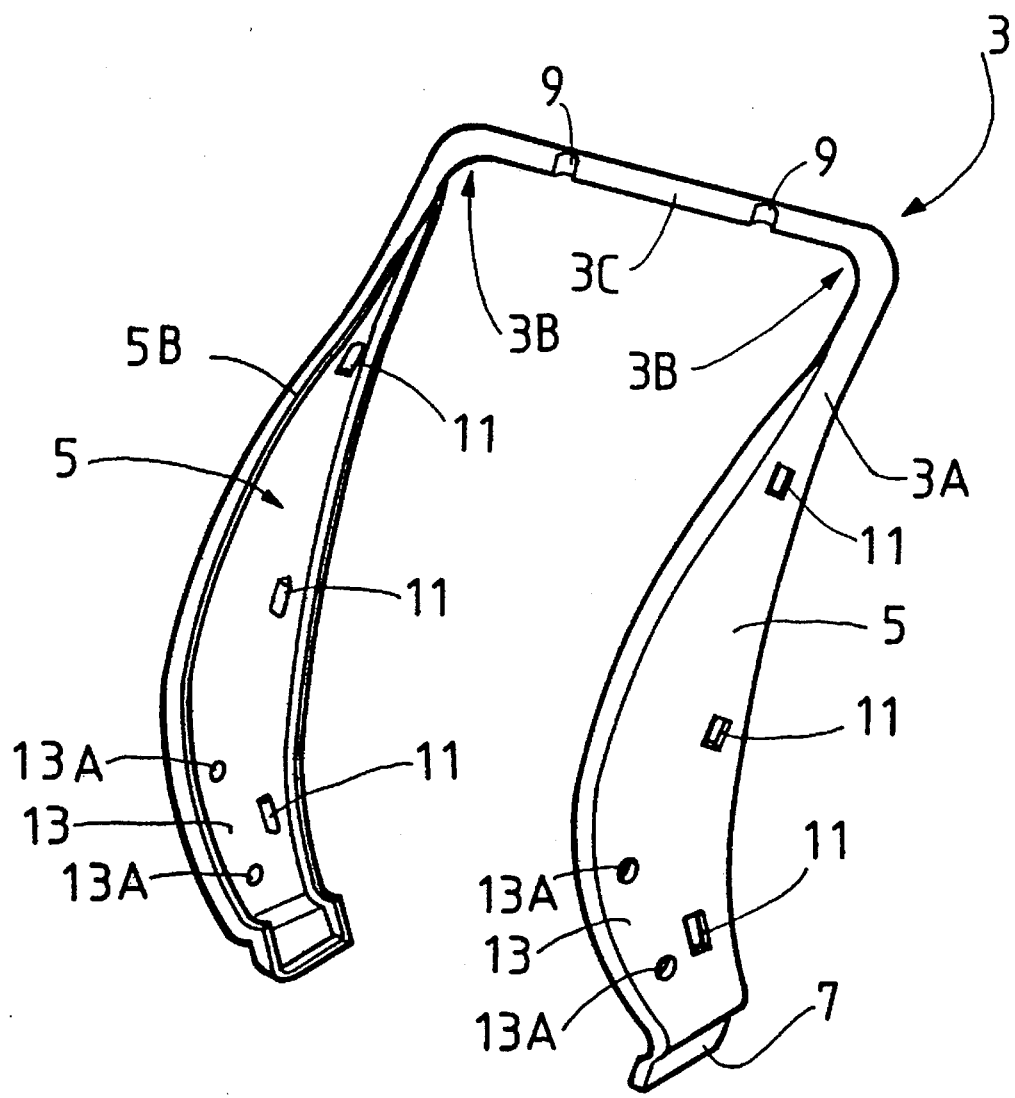
FIG. 9 is a perspective view of the seat back frame formed from the third frame plate shown in FIG. 8, in which the lower frame is not fixed.

When the third frame plate 23 is bent similarly to the same method used in the first embodiment, body of the seat back frame 1 (to which the lower frame 4 is not fixed) is obtained as shown in FIG. 9. Bending state of the upper frame 3 in the body of the seat back frame 1 is shown in FIG. 10. In FIG. 10, the horizontal portion 3C of the upper frame 3 is formed in the shape with the section having substantially "U" shape by opening lower side (upper side in FIG. 10) thereof. And corresponding to the positions where the bending portions 3B and the concave portions 9 (onto which the head-rest brackets 8 are fixed by welding) are formed in the upper frame 3, the junction plates 24, 25, 26, 27 are innerly bent and mutually fixed by welding, thereby the upper frame 3 is formed into a pipe shape having a closed section at the positions that the junction plates 24, 25, 26, 27 are formed. On the other hand, the standing portions 3A are, as shown in FIGS. 9, 10, gradually opened toward the side frames 5.

As mentioned above, in case that the junction plates 24, 25, 26, 27 are formed corresponding to the positions where the bending portions 3B and the concave portions 9 are formed in the upper frame 3 and further the thus formed junction plates 24, 25, 26, 27 are mutually bent and welded at the time when bending treatment of the upper frame 3 is conducted, twisting rigidity of the bending portions 3B and the concave portions 9 in the upper frame 3 can be further increased.

Figure 11:
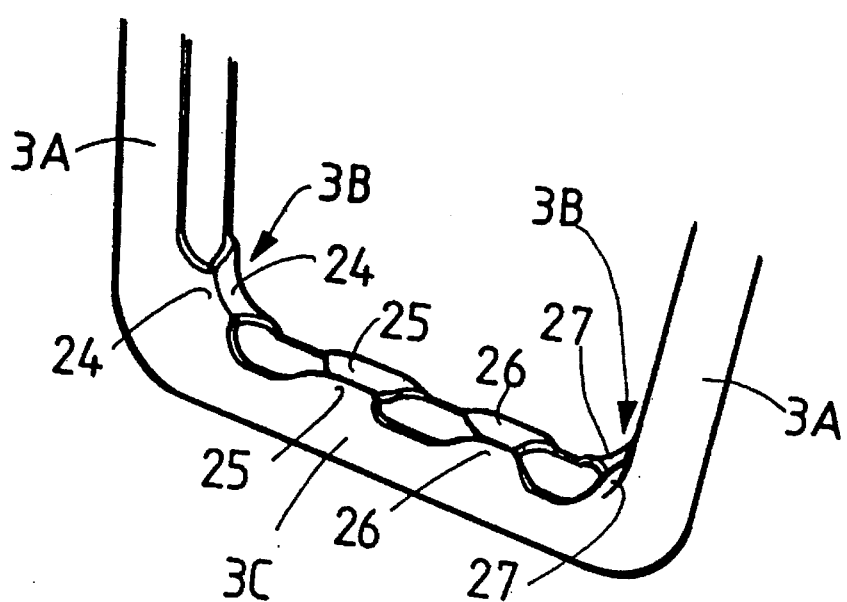
FIG. 11 is a view for explaining a state where the upper frame of the seat back frame in FIG. 9 is differently bent from the upper frame shown in FIG. 10.

And it is conceivable that the upper frame 3 and the side frames 5 are formed from the third frame plate 23, as shown in FIG. 11. That is to say, in FIG. 11, the horizontal portion 3C of the upper frame 3 is formed in the shape with the section having substantially "U" shape by opening lower side (upper side in FIG. 11), similarly to the construction in FIG. 10. And further, corresponding to the positions where the bending portions 3B and the concave portions 9 (onto which the head-rest brackets 8 are fixed by welding) are formed in the upper frame 3, the junction plates 24, 25, 26, 27 are innerly bent and mutually fixed by welding, thereby the upper frame 3 is formed into a round pipe shape having a closed section at the positions that the junction plates 24, 25, 26, 27 are formed.

As mentioned above, in case that the junction plates 24, 25, 26, 27 are formed corresponding to the positions where the bending portions 3B and the concave portions 9 are formed in the upper frame 3 and further the thus formed junction plates 24, 25, 26, 27 are mutually bent in the round pipe shape and welded at the time when bending treatment of the upper frame 3 is conducted, twisting rigidity of the bending portions 3B and the concave portions 9 in the upper frame 3 can be further increased, similarly to the construction in FIG. 10.

Figure 12:
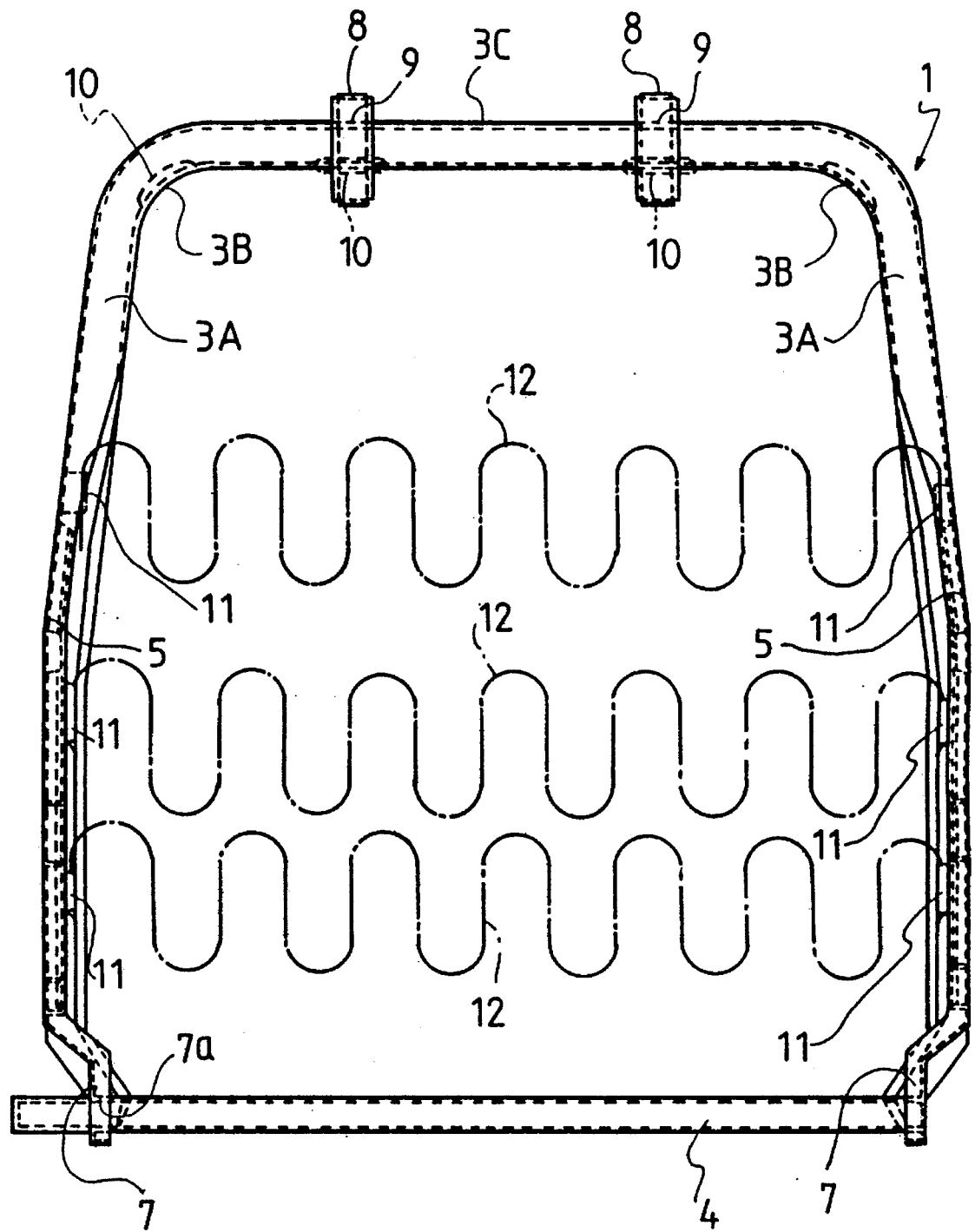
FIG. 12 is a front view showing the other modification of the first embodiment.

Furthermore, as a modification of the first embodiment, it is conceivable the seat back frame 1, as shown in FIG. 12. That is to say, in the seat back frame 1 in FIG. 12, a through hole 7A is opened in one of the reclining installing portions 7 (in FIG. 12, the left portion 7). And the right end of the lower frame 4 is welded to the right portion 7. Further, the left end of the lower frame 4 is passed into the through hole 7A and welded to the other portion 7 (in FIG. 12, the left portion 7) after being passed until the length of the lower frame 4 between both the reclining installing portions 7 corresponds to a predetermined width of the seat back frame 1. According to such modification, the length of the lower frame 4 can be finely adjusted in absorbing dispersion occurring in a width direction of the frame 1 when the seat back frame 1 is formed.

Here, in the first embodiment, it is conceivable that the slit connecting portions 10 are entirely formed at the edge portion of the slit 8 in the upper frame 3.

Next, a seat back frame according to the second embodiment of the present invention will be described with reference to FIGS. 13–15. Here, in the following, different point from the seat back frame 1 of first embodiment will be mainly described.

Figure 13:
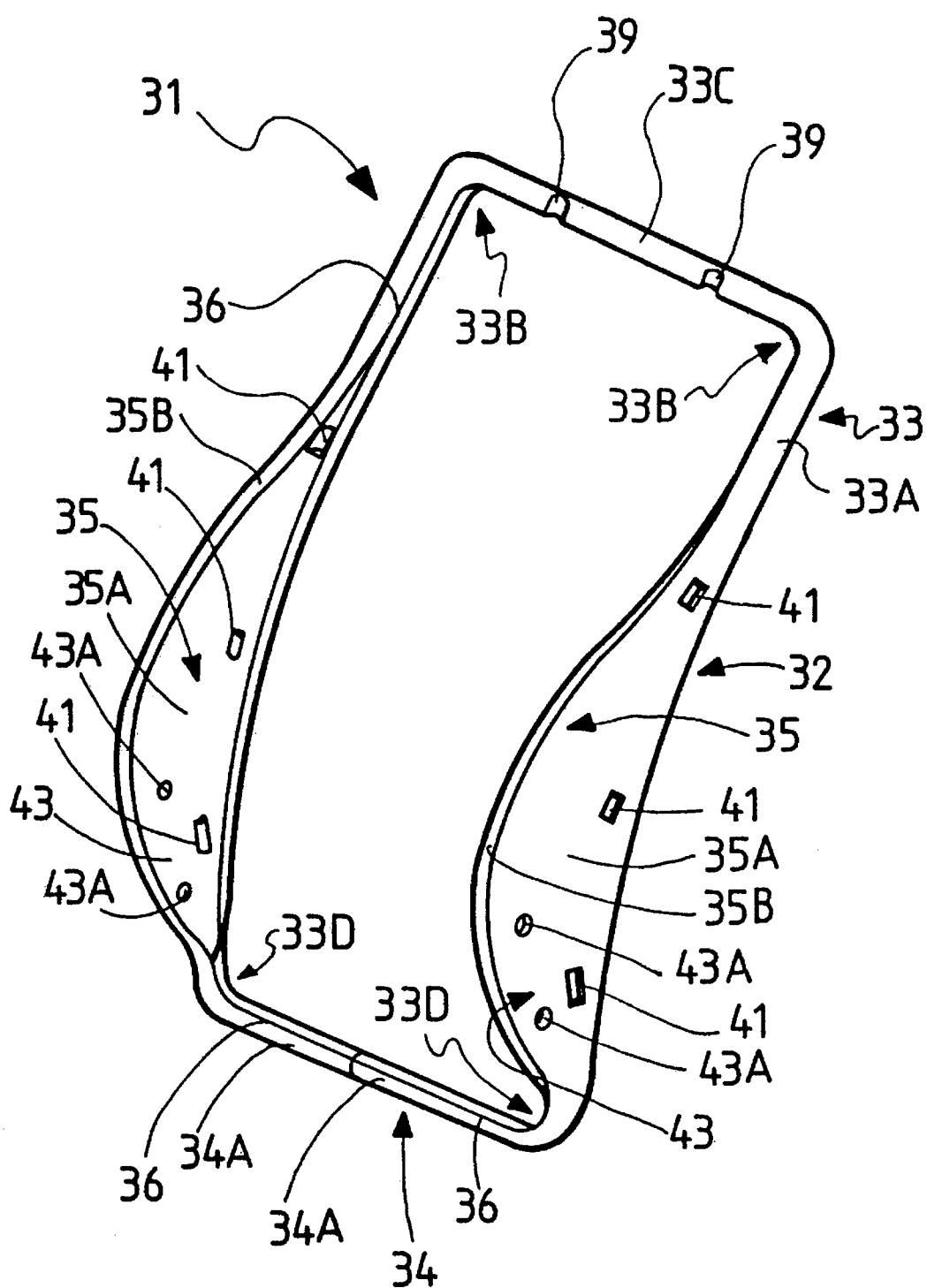
FIG. 13 is a perspective view of a seat back frame according to the second embodiment, FIGS. 14(A–C) are views showing a state where the fourth frame plate for forming the seat back frame is bent.

In FIG. 13, a seat back frame 31 is basically constructed from a frame body 32 which is shaped in rectangle. And the frame body 32 has an upper frame 33 constructing an upper part of the seat back frame 31, a lower frame 34 constructing a lower part thereof and a pair of side frames 35 each of which is formed between the upper frame 33 and the lower frame 34.

Here, the upper frame 33, the side frames 35 and the lower frame 34 are, as mentioned hereinafter, simultaneously formed into one body by bending a fourth frame plate 44 which is obtained through punching a thin raw metallic plate such as an iron plate into a predetermined shape by pressing treatment. The upper frame 33 and the lower frame 34 are formed into a pipe construction having a closed section with a slit 36 and each of the side frames 35 is formed into a flat shape. The side frames 35 support a driver sitting a seat back from both sides of the seat back frame 31. And the lower frame 34 is, as mentioned hereinafter, formed from a pair of lower members 34A, each of which is extended from each of the lower ends of the side frames 35, and both ends of the lower members 34A are mutually welded.

The upper frame 33 has a pair of standing portions 33A each of which is upward extended from each of the side frames 5 as shown in FIG. 13 and a horizontal portion 33C horizontally connecting between both the standing portions 33A through a pair of bending portions 33B. And in the horizontal portion 33A, a pair of concave portions 39 for fixing a pair of head-rest brackets (not shown) are formed. On the concave portions 39, the head-rests are fixed by welding. Here, each of the head-rest brackets is welded at four points on each of the concave portions 39, by similar method utilized in the first embodiment as shown in FIG. 7.

Further, corresponding to each of the bending portions 33B and each of the concave portions 39, edge portions of the slit 36 in the upper frame 33 are, similarly to the first embodiment, mutually welded and thereby slit connecting portions (not shown) are formed. Each of these slit connecting portions is to give high twisting rigidity to the upper frame 33. Based on the slit connecting portions, it can certainly prevent the seat back from being deformed in case that weight of the driver is locally loaded to upper part of the seat back.

Each of the side frames 35 is continuously formed from each lower end of the standing portions 33A in the upper frame 33 and the side frame 35 is constructed from a flat plate 35A and a wall 35B surrounding the flat plate 35A. The wall 35B is formed by gradually opening the slit 36 and surrounds the flat plate 35A. And in the flat plate 35A, a bead 35C for reinforcing the flat plate 35A is formed. Here, the wall 35B and the bead 35C formed in the flat plate 35A of the side frame 35 act to give high rigidity to the flat plate 35A. Such action of the wall 35B and the bead 35C is as same as in the first embodiment.

And in each of the flat plates 35A of the side frames 35, three spring clamps 41 are formed by innerly raising the flat plate 35A at three positions. Three pairs of S-shaped springs (not shown) are installed between three pairs of the spring clamps 41.

At each lower part of the side frames 35, a reclining installing portion 43 for installing a reclining device (not shown) is formed into one body with the side frame 35 and a nut is fixed to a installing hole 43A opened in the reclining installing portion 43. And the reclining device is installed to the installing portion 43 through the installing hole 43A and the nut. The above construction of the reclining installing portions 43 are as same as in the first embodiment.

Next, process for producing the above constructed seat back frame 31 of the second embodiment will be described with reference to FIG. 14. At first, as shown in FIG. 14(A), the fourth frame plate 44 which is utilized for forming the upper frame 33, the side frames 35 and the lower frame 34 is punched and obtained from the raw flat metallic plate by pressing treatment.

And when the fourth frame plate 44 is taken, portion for forming the side frame 35 in the fourth frame plate 44 is punched with a size in which bending area for forming the wall 35B in a subsequent process is added. And three holes shaped like as "⊃" are formed in each of the side frame 35 at three positions where the spring clamps 41 are raised and further the installing holes 43A of the reclining installing portions 43 are opened. At this point, construction of the fourth frame plate 44 is as same as the first frame plate 20 in the first embodiment.

On the other hand, from both sides of portion for forming the side frames 35, portions for forming the lower members 34A which constructs the lower frame 34 in cooperation with each other are extended, therefore the upper frame 33, the side frames 35 and the lower frame 34 are simultaneously formed into one body from the fourth frame plate 44. This construction is different from the lower frame 4 in the first embodiment which is independently formed and welded to both of the reclining installing portions 7.

Next, reduction process is conducted for entire periphery of the fourth frame plate 44 and thereby, as shown in FIG. 14(B), the wall 35B is formed around each of the side frame 35. Similarly to the side frames 35, walls are formed at side edges of portion which becomes the upper frame 33. Further, at the same time when the above reduction process is conducted, walls are formed at side edges of portions which become the lower frame 34. And the spring clamps 41 are formed by raising process thereof.

Following to the above, as shown in FIG. 14(C), both the walls formed at side edges of the upper frame 33 and the walls formed at side edges of portions which become the lower frame 34 are round bent into a pipe form, thereby the upper frame 33 and the lower frame 34 are formed into the shape with closed section having the slit 36.

Thereafter, the standing portions 33A and the horizontal portion 33C are formed by bending the upper frame 33 at two bending portions 33B through bending machine and further two concave portions 39, which are utilized for fixing the head-rest brackets, are formed at two positions in the horizontal portion 33C. Further, each of the lower members 34A extended from the lower ends of the side frames 35 is bent through the bending portions 33D and thereafter both ends of the lower members 34A are mutually fixed by welding.

Here, though the head-rest brackets are welded onto the concave portions 39 in the horizontal portions 33C and further the slit connecting portions are formed corresponding to both the concave portions 39 and the bending portions 33B, methods for welding the head-rest brackets and forming the slit connecting portions are as same as those in the first embodiment, therefore detailed description thereof will be omitted.

The thus constructed seat back frame 31 is combined with a cushion pad and a seat cover covering the cushion pad, as a result, a seat back is formed. Next, in case that the seat back is formed, construction in which the seat cover is equipped with the seat back frame 31 in use of the lower frame 34 will be described hereinafter with reference to FIG. 15.

Figure 15:
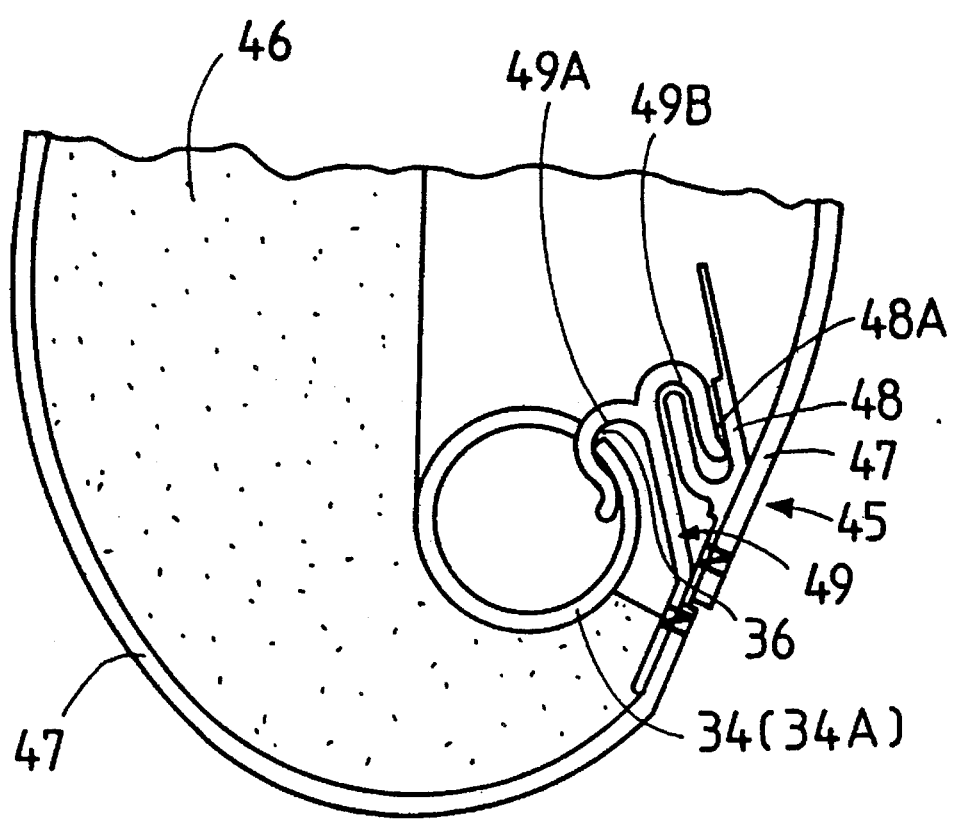
FIG. 15 is a schematic sectional view partially showing a lower part of a seat back which is constructed from the seat back frame.

In a seat back 45 shown in FIG. 15, a cushion pad 48 is put on the S-shaped springs installed between three pairs of the spring clamps 41 and the cushion pad 48 is covered by a seat cover 47. And the lower frame 34 is arranged at lower part of the seat back 45 and the slit 38 formed in the lower frame 34 is opened toward an upper inclined direction as shown in FIG. 15.

And a first hook member 48 is sewed to the inner side of the seat cover 47 near the lower frame 34 and the first hook member 48 has a length corresponding to entire width of the seat back 45. In the hook member 48, a receiving portion 48A having a U-shape in seeing from the side surface thereof is formed.

Further, similarly to the first hook member 48, a second hook member 49 is sewed to the inner side of the seat cover 47 near the first hook member 48 and the second hook member 49 has a length corresponding to entire width of the seat back 45, the length thereof being as same as that of the first hook member 48. And at a side to the lower frame 34 (the left side in FIG. 15), a hooking portion 49A which is hooked into the slit 38 is formed into one body with the second hook member 49 and at a side to the first hook member 48 (the right side in FIG. 15), a hooking portion 49B which is hooked in the receiving portion 48A of the first hook member 48 is formed into one body with the second hook member 49.

According to the above construction, the seat cover 47 can be easily equipped with the seat back frame 31 in utilizing the slit 36 formed in the lower frame As detailedly mentioned above, according to the seat back frame 31 of the second embodiment, the upper frame 33, the side frames 35 and the lower frame 34 can be simultaneously formed from the fourth frame plate 44. Therefore, number of the members to construct the seat back frame 31 and processes for producing thereof can be effectively reduced, thereby total cost of the seat back frame 31 can be decreased.

And the seat cover 47 covering the cushion pad 46 can be certainly and easily equipped with the seat back frame 31 through the receiving portion 48A of the first hook member 48, the hooking portions 49A, 49B of the second hook member 49 in cooperation with the slit 36 formed in the lower member 34.

Next, a seat back frame according to the third embodiment of the present invention will be described with reference to FIGS. 16 and 17. Here, in the following, different point from the seat back frame of the first embodiment will be mainly described.

Figure 16:
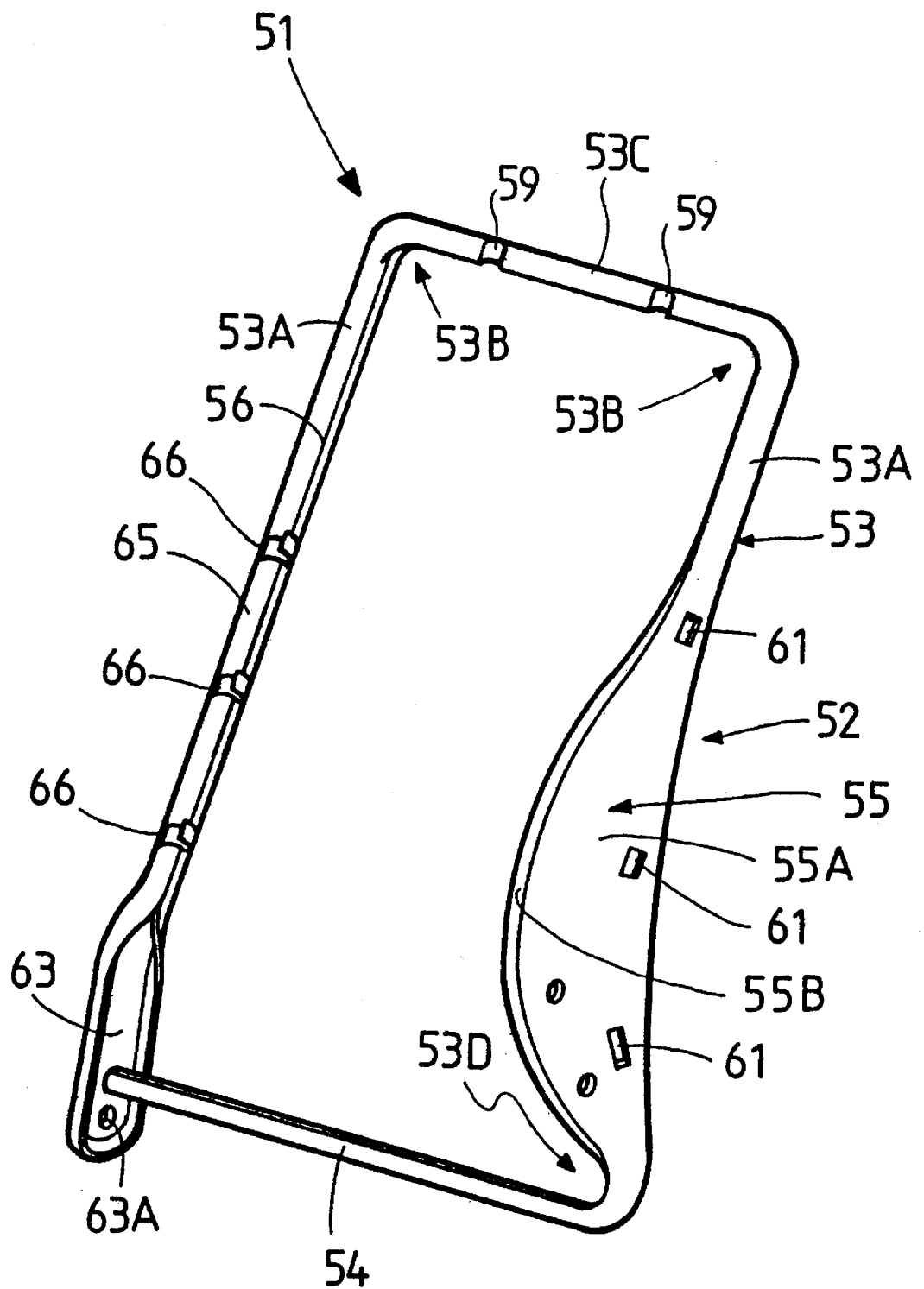
FIG. 16 is a perspective view of a seat back frame according to the third embodiment, FIGS. 17(A–C) are views showing a state where the fifth frame plate for forming the seat back frame is bent.
Figure 20:
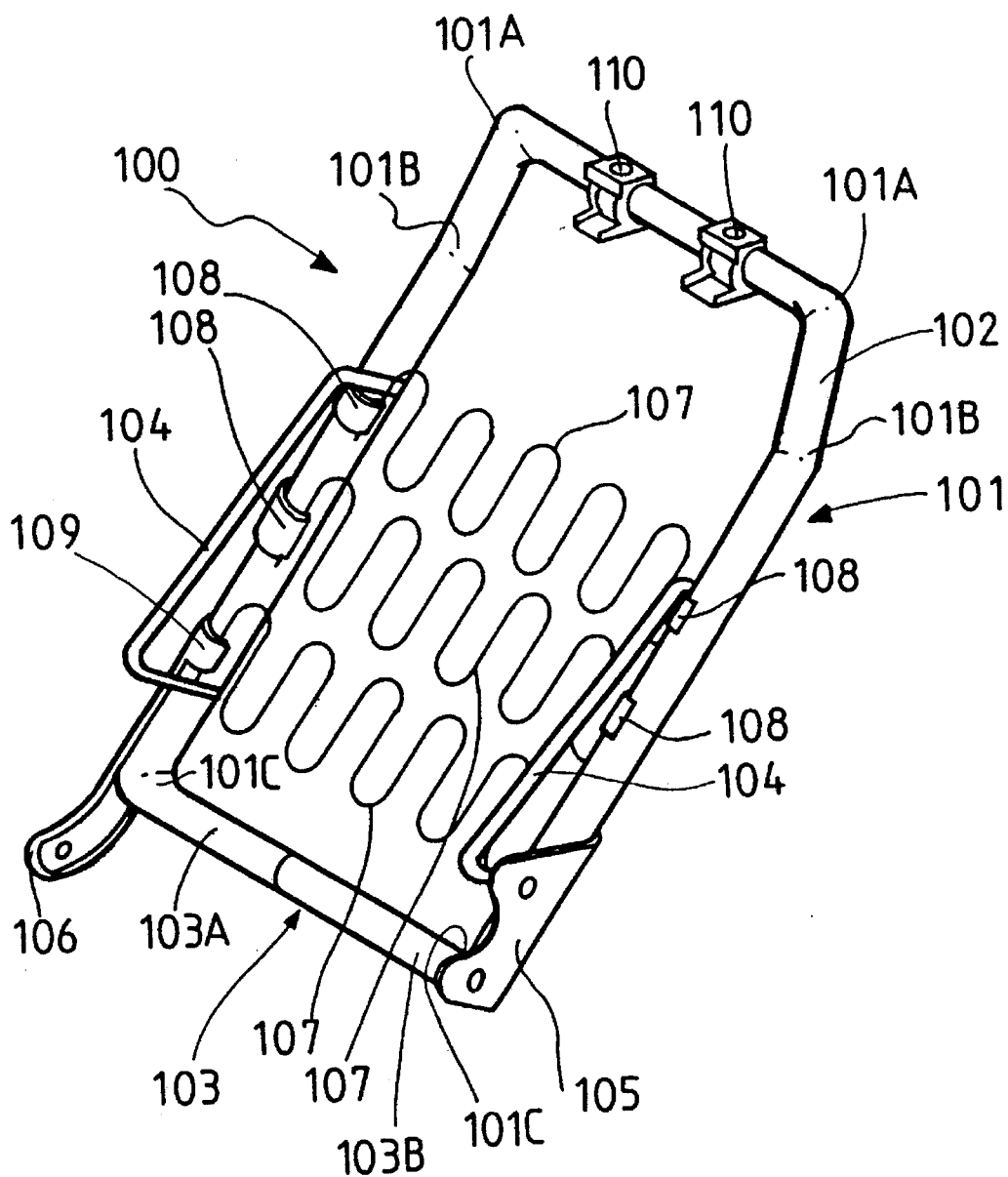

In FIG. 16, a seat back frame 51 is basically constructed from a frame body 52 which is shaped in rectangle. And the frame body 52 has an upper frame 53 constructing an upper part of the seat back frame 51, a connecting frame 65 shaped into a round pipe form which is continuously extended from the upper frame 53 at the left side of the seat back frame 51 and has a reclining installing portion 63 for installing a reclining device at the lower end thereof, a lower frame 54 constructing a lower part of the seat back frame 51 and a side frame 55 formed between the upper frame 33 and the lower frame 34 at the right side of the seat back frame 51.

Here, the reclining installing portion 63, the connecting frame 65, the upper frame 53, the side frame 55 and the lower frame 34 are, as mentioned hereinafter, simultaneously formed into one body by bending a fifth frame plate 64 which is obtained through punching a thin raw metallic plate such as an iron plate into a predetermined shape by pressing treatment. The upper frame 53, the lower frame 54 and the connecting frame 65 are formed into a pipe construction having a closed section with a slit 56 and the side frame 55 is formed into a flat shape. The side frame 55 supports a driver sitting a seat back from one side of the seat back frame 51. And the lower frame 54 is, as mentioned hereinafter, extended from the lower end of the side frame 55 and one end (left end) thereof is fixed to the reclining installing portion 63 by welding.

The upper frame 53 has a pair of standing portions 53A, one being upward extended from upper end of the side frame 55 and the other being upward extended from the connecting frame 65, as shown in FIG. 16, and a horizontal portion 53C horizontally connecting between both the standing portions 53A through a pair of bending portions 53B. And in the horizontal portion 53A, a pair of concave portions 59 for fixing a pair of head-rest brackets (not shown) are formed. On the concave portions 59, the head-rests are fixed by welding. Here, each of the head-rest brackets is welded at four points on each of the concave portions 59, by similar method utilized in the first embodiment as shown in FIG. 7.

Further, corresponding to each of the bending portions 53B and each of the concave portions 59, edge portions of the slit 56 in the upper frame 53 are, similarly to the first embodiment, mutually welded and thereby slit connecting portions (not shown) are formed. Each of these slit connecting portions are to give high twisting rigidity to the upper frame 53. Based on the slit connecting portions, it can certainly prevent the seat back from being deformed in case that weight of the driver is locally loaded to upper part of the seat back.

The side frame 55 is continuously formed from lower end of the standing portions 53A in the upper frame 53 and the side frame 55 is constructed from a flat plate 55A and a wall 55B surrounding the flat plate 55A. The wall 55B is formed by gradually opening the slit 56 and surrounds the flat plate 55A. And in the flat plate 55A, a bead (not shown) for reinforcing the flat plate 55A is formed. Here, the wall 55B and the bead formed in the flat plate 55A of the side frame 55 act to give high rigidity to the flat plate 55A. Such action of the wall 55B and the bead is as same as in the first embodiment.

And in the flat plate 55A of the side frame 55, three spring clamps 61 are formed by innerly raising the flat plate 65A at three positions. Further, three spring clamps 66 are arranged to the connecting frame 65 corresponding to the spring clamps 61 formed in the side frame 55. Three pairs of S-shaped springs (not shown) are installed between three pairs of the spring clamps 41, 66.

In the reclining installing portion 63 formed at lower part of the connecting frame 65, an installing hole 63A around which a nut is welded is opened and the reclining device is installed to the installing portion 63 through the installing hole 63A and the nut. The above construction of the reclining installing portions 63 is as same as in the first embodiment. Based on such construction of the seat back frame 51 in the third embodiment, it can correspond to a seat back frame where the reclining device is connected to one side of the seat back frame.

Next, process for producing the above constructed seat back frame 51 of the third embodiment will be described with reference to FIG. 17. At first, as shown in FIG. 17(A), the fifth frame plate 64 which is utilized for forming the reclining installing portion 63, the connecting frame 65, the upper frame 53, the side frame 55 and the lower frame 54 is punched and obtained from the raw flat metallic plate by pressing treatment.

And when the fifth frame plate 64 is taken, portion for forming the side frame 55 in the fifth frame plate 64 is punched with a size in which bending area for forming the wall 55B in a subsequent process is added. And three holes shaped like as "⊃" are formed in the side frame 55 at three positions where the spring clamps 61 are raised and further the installing hole 63A of the reclining installing portion 63 is opened. At this point, construction of the fifth frame plate 64 is as same as the first frame plate 20 in the first embodiment.

Continuing to portion for forming the side frame 55, portion for forming the lower frame 54 is extended into one body. This construction is different from the lower frame 4 in the first embodiment which is independently formed and welded to both of the reclining installing portions 7.

Next, reduction process is conducted for entire periphery of the fifth frame plate 64 and thereby, as shown in FIG. 17(B), the wall 55B is formed around the side frame 55. Similarly to the side frames 55, walls are formed at side edges of portion which becomes the upper frame 53. Further, at the same time when the above reduction process is conducted, walls are formed at side edges of portion which becomes the connecting frame 65, portion which becomes the reclining installing portion 63 and portion which becomes the lower frame 54. And the spring clamps 61 are formed by raising process thereof.

Following to the above, as shown in FIG. 17(C), the walls formed at side edges of the connecting frame 65, the upper frame 53 and the lower frame 54 are round bent into a pipe form, thereby the connecting frame 65, the upper frame 53 and the lower frame 54 are formed into the shape with closed section having the slit 56.

Thereafter, the standing portions 53A and the horizontal portion 53C are formed by bending the upper frame 53 at two bending portions 53B through bending machine and further two concave portions 59, which are utilized for fixing the head-rest brackets, are formed at two positions in the horizontal portion 53C. Further, portion extended from the lower end of the side frame 55 is bent through the bending portion 53D and thereafter the left end of the lower frame 54 is fixed to the reclining installing portion 63 by welding.

Here, though the head-rest brackets are welded onto the concave portions 59 in the horizontal portions 53C and further the slit connecting portions are formed corresponding to both the concave portions 59 and the bending portions 53B, methods for welding the head-rest brackets and forming the slit connecting portions are as same as those in the first embodiment, therefore detailed description thereof will be omitted.

And three spring clamps 66 are arranged to the connecting frame 65 and thereafter each of three pairs of S-shaped springs is installed between each pair of the spring clamp 61 and the spring clamp 66.

As detailedly mentioned above, according to the seat back frame 51 of the third embodiment, the reclining installing portion 63, the connecting frame 65, the upper frame 53, the side frame 55 and the lower frame 54 are simultaneously formed from the fifth frame plate 64 by bending thereof and the seat back frame 51 is completed by welding the end of the lower frame 54 to the reclining installing portion 63. Therefore, number of the members to construct the seat back frame 51 and processes for producing thereof can be effec-tively reduced and thereby total cost of the seat back frame 51 can be decreased. Further, the seat back frame 51 can correspond to the frame in which the reclining device is connected to one side of the seat back frame.

Following to the above, a seat back frame according to the fourth embodiment of the present invention will be described with reference to FIGS. 18 and 19.

In FIG. 18, a seat back frame 71 is basically constructed from a frame body 72 which is shaped in rectangle. And the frame body 72 has an upper frame 73 constructing an upper part of the seat back frame 71, a lower frame (not shown) constructing a lower part thereof and a pair of side frames 75 each of which is formed between the upper frame 73 and the lower frame.

Here, the upper frame 73 is constructed from a first upper member 73A which is extended from upper end in one of the side frames 75 (in FIG. 18, the left side frame 75) and formed to a horizontal portion 73C by bending at a bending portion 73B, a second upper member 73D which is extended from upper end in the other side frame 75 (in FIG. 18, the right side frame 75) and formed to a horizontal portion 73F by bending at a bending portion 73E and a third upper member 73G which is fixed to both ends of the horizontal portions 73C, 73F by welding. The third upper member 73G is constructed into a pipe with closed section having a slit 76 and in the third upper member 73G as in the mentioned embodiments, two concave portions 79 for fixing head-rest brackets are formed. The head-rest brackets are fixed by welding onto the concave portions 79 at four positions through the same method utilized in the first embodiment.

And both the left side frame 75 and the first upper member 73A and both the right side frame 75 and the second upper member 73D are simultaneously formed into one body by bending a frame plate (not shown) which is obtained through punching a thin raw metallic plate such as an iron plate into a predetermined shape by pressing treatment. The upper frame 73 is formed into a pipe construction having a closed section with a slit 76 and each of the side frames 75 is formed into a flat shape. The side frames 75 support a driver sitting a seat back from both sides of the seat back frame 71. And the lower frame is a pipe as same as that in the first embodiment and both ends thereof are welded to reclining installing portions 77 formed from lower ends of the side frames 75.

Further, corresponding to the bending portion 73B of the first upper member 73A, the bending portion 73E of the second upper member 73D and portions in the third upper member 73G where the concave portions 79 are formed, edge portions of the slit 76 in the upper frame 73 and of the slit 76 in the third upper member 73G are, similarly to the first embodiment, mutually welded and thereby slit connecting portions (not shown) are formed. Each of these slit connecting portions is to give high twisting rigidity to the upper frame 73. Based on the slit connecting portions, it can certainly prevent the seat back from being deformed in case that weight of the driver is locally loaded to upper part of the seat back.

Each of the side frames 75 is continuously formed from each lower end of the first upper member 73A and the second upper member 73D and the side frame 75 is constructed from a flat plate 75A and a wall 75B surrounding the flat plate 75A. The wall 75B is formed by gradually opening the slit 76 and surrounds the flat plate 75A. And in the flat plate 75A, a bead (not shown) for reinforcing the flat plate 75A is formed. Here, the wall 75B and the bead formed in the flat plate 75A of the side frame 75 act to give high rigidity to the flat plate 75A. Such action of the wall 75B and the bead is as same as in the first embodiment.

And in each of the flat plates 75A of the side frames 75, three spring clamps 81 are formed by innerly raising the flat plate 75A at three positions. Three pairs of S-shaped springs (not shown) are installed between three pairs of the spring clamps 81.

At each lower part of the side frames 75, a reclining installing portion 83 for installing a reclining device (not shown) is formed into one body with the side frame 75 and a nut is fixed to a installing hole 83A opened in the reclining installing portion 83. And the reclining device is installed to the installing portions 83 through the installing holes 83A and the nuts. The above construction of the reclining installing portions 83 are as same as in the first embodiment.

The thus constructed seat back frame 71 is produced through the same method as that utilized in the first and the second embodiments. Therefore, process for producing the seat back frame 71 will be omitted.

As detailedly mentioned above, according to the seat back frame 71 of the fourth embodiment, the upper frame 73 in the frame body 72 is constructed from the first upper member 73A, the second upper member 73D and the third upper member 73G. And both the left side frame 75 and the first upper member 73A and both the right side frame 75 and the second upper member 75D are formed by bending the frame plate which is obtained from the raw plate through pressing treatment. Further, the third upper member 73G is welded to both the first and the second upper members 73A, 73D.

Therefore, since the upper frame 73 is divided into three pieces (the first, the second and the third upper members 73A, 73D, 73G), the seat back frame 71 can correspond to seat back frames which have various kinds of widths.

Next, modification of the fourth embodiment will be described with reference to FIG. 19. In the modification, contrary to the fourth embodiment in which the lower frame is formed by welding both ends of a pipe to the reclining installing portions 77, it is characterized at a point that a lower frame 84 is divided into three lower members. The other construction is as same as that in the fourth embodiment and therefore detailed description thereof will be omitted.

In FIG. 19, that is to say, corresponding to that the upper frame 73 is divided into three upper members of the first upper member 73A, the second upper member 73D and the third upper member 73G, the lower frame 84 is divided into three lower members of a first lower member 84A which is extended from lower end of the left side frame 75 and formed with a horizontal portion 84C by bending at a bending portion 84B, a second lower member 84D which is extended from lower end of the right side frame 75 and formed with a horizontal portion 84F by bending at a bending portion 84E and a third lower member 84G which is fixed to both ends of the horizontal portions 84C, 84F. And the third lower member 84G is a pipe with a closed section having a slit.

As mentioned above, according to the modification shown in FIG. 19, since the lower frame 84 is, similarly to the upper frame 73, divided into three lower members of the first lower member 84A, the second lower member 84D and the third lower member 84G, the seat back frame 71 can more flexibly correspond to seat back frames which have various kinds of widths. And in addition to that the first upper member 73A and the second upper member 73D can be simultaneously formed into one body with the side frames 75, the first lower member 84 A and the second lower member 84D can be simultaneously formed into one body with the side frames 75, therefore number of the members for constructing the seat back frame 71 can be reduced. As a result, total cost of the seat back frame 71 can be decreased.

What is claimed is:

1. A seat back frame including; a frame body with an upper frame and a lower frame; a pair of side frames each of which is formed between the upper and the lower frame, the side frames supporting a driver from both sides of the seat back frame;

wherein at least the upper frame and the side frames are formed by bending a frame plate which is obtained from a raw flat plate through pressing treatment;

wherein the upper frame is formed into a pipe form having a slit with edge portions and the slit is welded at several positions of the edge portions; and wherein the lower frame is secured between the pair of side frames.

2. The seat back frame according to claim 1, wherein the slit is continuously formed on an inner side surface of the upper frame while the upper frame is bent at two bending portions.

3. The seat back frame according to claim 2, further comprising a pair of concave portions formed in the upper frame and head-rest brackets each of which is welded onto the concave portion.

4. The seat back frame according to claim 3, wherein the edge portions of the slit are welded at four positions corresponding to the bending portions and the concave portions.

5. The seat back frame according to claim 3, wherein the head-rest bracket is welded onto the concave portion at four positions by spot welding.

6. The seat back frame according to claim 1, wherein each of the side frames is constructed from a flat plate and a wall surrounding the flat plate.

7. The seat back frame according to claim 6, further comprising an installing portion formed at a lower end of the flat plate, the installing portion being utilized for installing a reclining device.

8. The seat back frame according to claim 6, further comprising a plurality of clamps formed in each of the flat plates of the side frames for installing S-shaped springs between the flat plates.

9. The seat back frame according to claim 6, further comprising a bead portion formed on each of the flat plates.

10. The seat back frame according to claim 1, wherein the lower frame is constructed from a round pipe having a first end secured to a first side frame of said pair of side frames and a second end secured to a second side frame of said side frames.

11. The seat back frame according to claim 10, further comprising:

a through hole opened on one of the side frames;

wherein one end of the round pipe is welded to the other side frame and the other end of the round pipe is passed in and welded to the through hole at a position where a width between the side frames coincides with a predetermined width of the seat back frame.

12. The seat back frame according to claim 1, wherein the lower frame is constructed from a pair of lower members, each lower member being continuously extended from an each lower end of the side frames and formed into a pipe form having a slit; and wherein ends of the lower members are mutually welded.

13. The seat back frame according to claim 12, further comprising:

a cushion pad arranged on the seat back frame;

a seat cover covering the cushion pad;

a first hook member attached to an inner side of the seat cover, the first hook member having a receiving portion;

a second hook member attached to the inner side of the seat cover near the first hook member, the second hook member having a first hooking portion hooked into the slit of the pipe and a second hooking portion hooked into the receiving portion of the first hook member.

* * * * *